United States Patent
Yu

(10) Patent No.: US 12,008,214 B2
(45) Date of Patent: Jun. 11, 2024

(54) METHOD FOR RESTORING HOME SCREEN AND ELECTRONIC DEVICE APPLYING THE SAME

(71) Applicant: Samsung Electronics Co., Ltd., Gyeonggi-do (KR)

(72) Inventor: Hyemi Yu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/428,507

(22) PCT Filed: Aug. 3, 2021

(86) PCT No.: PCT/KR2021/010155
§ 371 (c)(1),
(2) Date: Feb. 16, 2023

(87) PCT Pub. No.: WO2022/030955
PCT Pub. Date: Feb. 10, 2022

(65) Prior Publication Data
US 2023/0214087 A1    Jul. 6, 2023

(30) Foreign Application Priority Data

Aug. 4, 2020   (KR) ......................... 10-2020-0097137

(51) Int. Cl.
G06F 3/048     (2013.01)
G06F 3/0482    (2013.01)
G06F 3/0483    (2013.01)

(52) U.S. Cl.
CPC .......... *G06F 3/0482* (2013.01); *G06F 3/0483* (2013.01)

(58) Field of Classification Search
CPC .............................. G06F 3/0482; G06F 3/0483
See application file for complete search history.

(56) References Cited

U.S. PATENT DOCUMENTS 8,554,887 B2   10/2013   Wallis et al.
RE44,836 E     4/2014    Wallis et al.
(Continued)

FOREIGN PATENT DOCUMENTS

KR    1020130119172    10/2013
KR    1020140094082    7/2014
(Continued)

OTHER PUBLICATIONS

International Search Report dated Nov. 30, 2021 issued in counterpart application No. PCT/KR2021/010155, 10 pages.
(Continued)

*Primary Examiner* — David E Choi
(74) *Attorney, Agent, or Firm* — The Farrell Law Firm, P.C.

(57) ABSTRACT

A method for restoring a home screen of an electronic device is disclosed that includes backing up a first home screen being a home screen of a first electronic device including a first display having a first structure, determining a second structure being a structure of a second display being a display of a second electronic device different from the first electronic device, and restoring the first home screen to a second home screen being a home screen of the second electronic device based on the second structure. The restoring to the second home screen includes converting a layout where a plurality of content making up the first home screen are arranged to correspond to the second structure. In addition, various embodiments recognized through the specification are possible.

14 Claims, 32 Drawing Sheets

(56) References Cited

U.S. PATENT DOCUMENTS

| | | |
|---|---|---|
| 9,128,882 B2 | 9/2015 | Williams |
| 9,247,039 B2 | 1/2016 | Park |
| 9,792,183 B2* | 10/2017 | Lee ................... G06F 11/1441 |
| 9,858,153 B2 | 1/2018 | Dart et al. |
| 10,402,592 B2 | 9/2019 | Bae et al. |
| 10,503,459 B2 | 12/2019 | Lim et al. |
| 10,963,209 B2 | 3/2021 | Shim |
| 2006/0234623 A1 | 10/2006 | Wallis et al. |
| 2010/0179942 A1 | 7/2010 | Wallis et al. |
| 2010/0223563 A1 | 9/2010 | Green |
| 2011/0016089 A1 | 1/2011 | Freedman et al. |
| 2011/0160189 A1 | 6/2011 | Okatsu et al. |
| 2012/0088548 A1 | 4/2012 | Yun et al. |
| 2013/0151981 A1 | 6/2013 | Green |
| 2013/0278484 A1 | 10/2013 | Hwang et al. |
| 2013/0345882 A1* | 12/2013 | Dushane ............... G05B 15/02 700/276 |
| 2014/0203999 A1 | 7/2014 | Shim |
| 2014/0359051 A1 | 12/2014 | Dart et al. |
| 2015/0026644 A1* | 1/2015 | Cho .................... G06F 11/1451 715/835 |
| 2015/0355816 A1 | 12/2015 | Shim |
| 2016/0188280 A1 | 6/2016 | Shim |
| 2017/0277902 A1 | 9/2017 | Bae et al. |
| 2018/0011630 A1* | 1/2018 | Kim ...................... G06F 1/1626 |
| 2019/0034283 A1* | 1/2019 | Jang ................... H04B 5/0031 |
| 2020/0167121 A1 | 5/2020 | Shim |
| 2020/0241732 A1* | 7/2020 | Lu ....................... G06F 3/04842 |
| 2023/0214087 A1* | 7/2023 | Yu .......................... G06F 9/451 715/762 |

FOREIGN PATENT DOCUMENTS

| | | |
|---|---|---|
| KR | 1020140128843 | 11/2014 |
| KR | 1020160042739 | 4/2016 |

OTHER PUBLICATIONS

European Search Report dated Nov. 28, 2023 issued in counterpart application No. 21852295.1-1224, 7 pages.

* cited by examiner

|   | TERMINAL TO RESTORE | TERMINAL TO BE RESTORED | SCREEN OPTION TO RESTORE | | | SCREEN OPTION TO BE RESTORED | | | ADDITIONAL OPTION | NOTES |
|---|---|---|---|---|---|---|---|---|---|---|
| 1 | Phone | >Foldable | | | | | Main | Main and Front | | |
| 2 | Phone | >Rollable | | | | Full | Split(1+2) | | With-1page | |
| 3 | Phone | >Multi foldable | | | | In 1/3 page | In 2/3 page | In Full page | | FRONT AND MAIN SYNC CRITERION |
| 4 | Foldable | >Foldable | Front screen | Main screen | Each screen | Front screen | Main screen | Each screen | | |
| 5 | Foldable | >Rollable | Front screen | Main screen | Each screen | Front screen | Main screen | Each screen | With-1page | |
| 6 | Foldable | >Multi foldable | Front screen | Main screen | Each screen | Front screen | Main screen | Each screen | | |

FIG.26

| 1. TERMINAL TO RESOTRE (SELECT TERMINAL/SCREEN BACKED UP TO CLOUD) | | TERMINAL TO BE RESOTRED (SELECT TERMINAL/SCREEN TO BE RESTORED TO CLOUD) | |
|---|---|---|---|
| TERMINAL | SELECTION SCREEN/PAGE | TERMINAL | SELECTION SCREEN/PAGE |
| ONE | ONE | ONE | ONE |
| ONE | ONE | PLURAL | ONE |
| ONE | ONE | PLURAL | ONE |
| ONE | ONE | PLURAL | PLURAL |
| ONE | PLURAL | ONE | ONE |
| ONE | PLURAL | ONE | PLURAL |
| ONE | ONE | PLURAL | ONE |
| ONE | PLURAL | PLURAL | PLURAL |

| 1. TERMINAL TO RESOTRE (SELECT TERMINAL/SCREEN BACKED UP TO CLOUD) | | 2. TERMINAL TO BE RESOTRED (SELECT TERMINAL/SCREEN TO BE RESTORED TO CLOUD) | |
|---|---|---|---|
| TERMINAL | SELECTION SCREEN/PAGE | TERMINAL | SELECTION SCREEN/PAGE |
| PLURAL | ONE BY ONE | ONE | ONE |
| PLURAL | ONE BY ONE | PLURAL | ONE |
| PLURAL | ONE BY ONE | PLURAL | ONE |
| PLURAL | ONE BY ONE | PLURAL | PLURAL |
| PLURAL | PLURAL | ONE | ONE |
| PLURAL | PLURAL | ONE | PLURAL |
| PLURAL | PLURAL | PLURAL | ONE |
| PLURAL | PLURAL | PLURAL | PLURAL |

FIG.32

METHOD FOR RESTORING HOME SCREEN AND ELECTRONIC DEVICE APPLYING THE SAME

PRIORITY

This application is a National Phase Entry of PCT International Application No. PCT/KR2021/010155, which was filed on Aug. 3, 2021, and claims priority to Korean Patent Application No. 10-2020-0097137, which was filed on Aug. 4, 2020, the entire content of each of which is incorporated herein by reference.

TECHNICAL FIELD

Various embodiments disclosed in the disclosure relate to a method for restoring a home screen and an electronic device applying the same.

BACKGROUND ART

An electronic device may display a screen on its display. The electronic device may display a home screen before a user first turns on the display or runs an application. The home screen may include at least one icon which runs an application. Alternatively, the home screen may include content such as a time, a widget, and/or a background. The home screen may have a layout corresponding to a shape of the display.

Meanwhile, the home screen of the electronic device moves to another electronic device to be restored on the other electronic device. Alternatively, the home screen of the electronic device may be backed up on a network such as cloud to be restored on another electronic device.

DISCLOSURE

Technical Problem

Recently, electronic devices of various structures such as a foldable device, a rollable device, and/or a multi-foldable device have been developed. Two electronic device having different structures may have displays of different structures, respectively. In this case, it is not easy to restore a home screen of any one electronic device on another electronic device.

Various embodiments disclosed in the disclosure provide a method for restoring a home screen of any one electronic device to a home screen on an electronic device having another structure and an electronic device applying the same.

Technical Solution

In accordance with an aspect of the disclosure, a method for restoring a home screen of an electronic device is provided. The method may include backing up a first home screen being a home screen of a first electronic device including a first display having a first structure, determining a second structure being a structure of a second display being a display of a second electronic device different from the first electronic device, and restoring the first home screen to a second home screen being a home screen of the second electronic device based on the second structure. The restoring to the second home screen may include converting a layout where a plurality of pieces of content making up the first home screen are arranged to correspond to the second structure.

In accordance with another aspect of the disclosure, an electronic device is provided. The electronic device may include a display, a memory, a communication circuitry, and a processor. The processor may be configured to receive a first home screen being a home screen of an external electronic device, the home screen being backed up, using the communication circuitry, determine a structure of the display based on structure data stored in the memory, convert a layout where a plurality of pieces of content making up the first home screen are arranged to correspond to the structure to restore the first home screen to a second home screen being a home screen of the electronic device, and display the second home screen on the display.

In accordance with another aspect of the disclosure, a method for restoring a home screen of an electronic device is provided. The method may include determining a structure of the electronic device, selecting a first home screen corresponding to the type among a plurality of screens backed up to a server, and restoring the first home screen to a second home screen being a home screen of the electronic device based on a structure of a display of the electronic device. The restoring to the second home screen may include converting a layout where a plurality of pieces of content making up the first home screen are arranged to correspond to the structure.

Advantageous Effects

According to embodiments disclosed in the disclosure, when restoring a home screen between electronic devices with different structures, the home screen may be restored to correspond to a layout of a display of the restored electronic device.

Furthermore, according to embodiments disclosed in the disclosure, when restoring a home screen between electronic devices with different structures, the home screen may be restored in a form the user wants.

In addition, various effects ascertained directly or indirectly through the disclosure may be provided.

DESCRIPTION OF DRAWINGS

FIG. 26 is a table illustrating a method for restoring a home screen of a first electronic device on a second electronic device according to an embodiment;

FIG. 31 is a table illustrating a method for restoring a home screen of one electronic device, backed up on a network, according to an embodiment; and FIG. 32 is a table illustrating a method for restoring home screens of a plurality of electronic devices, backed up on a network, according to an embodiment.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
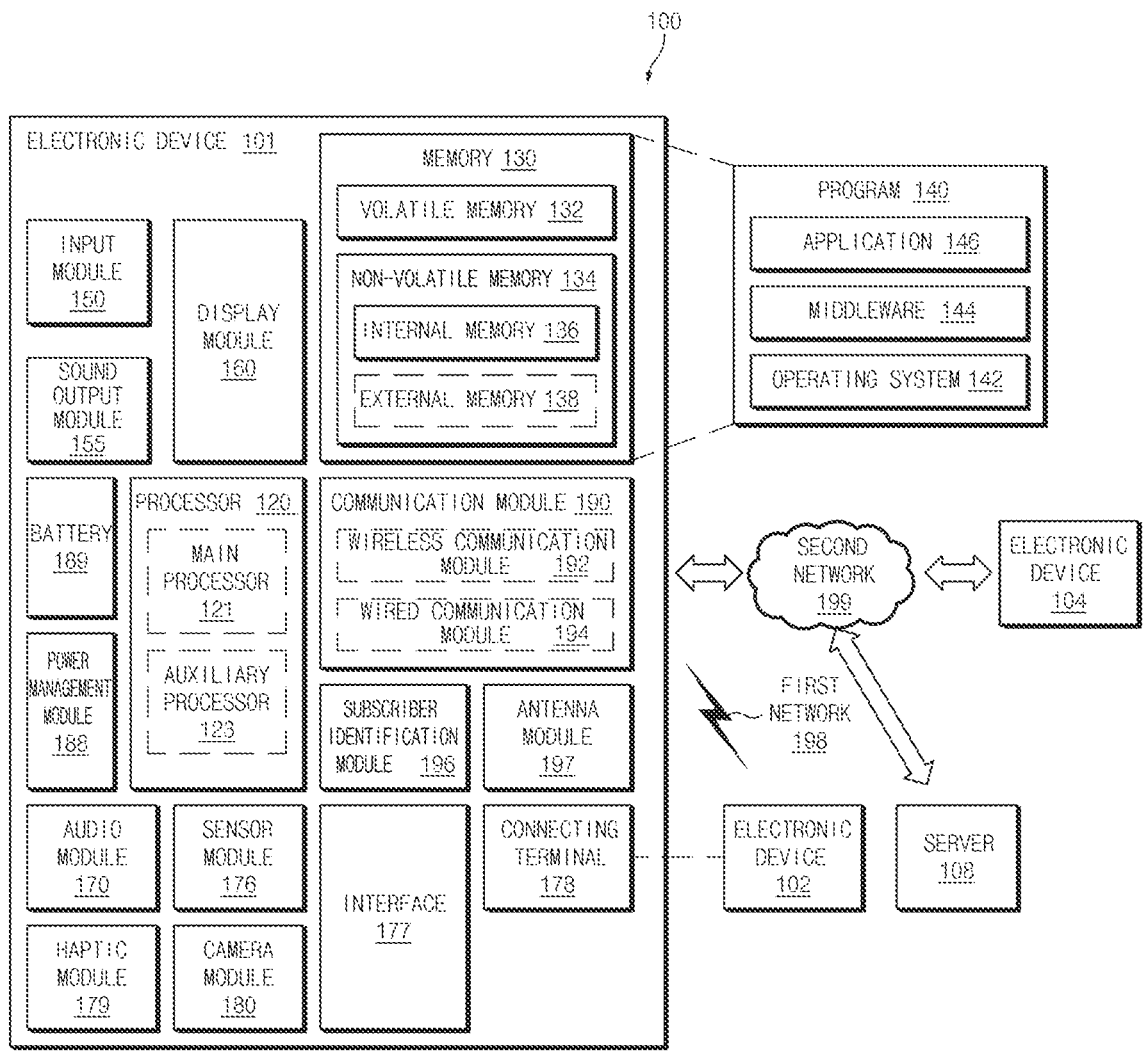
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
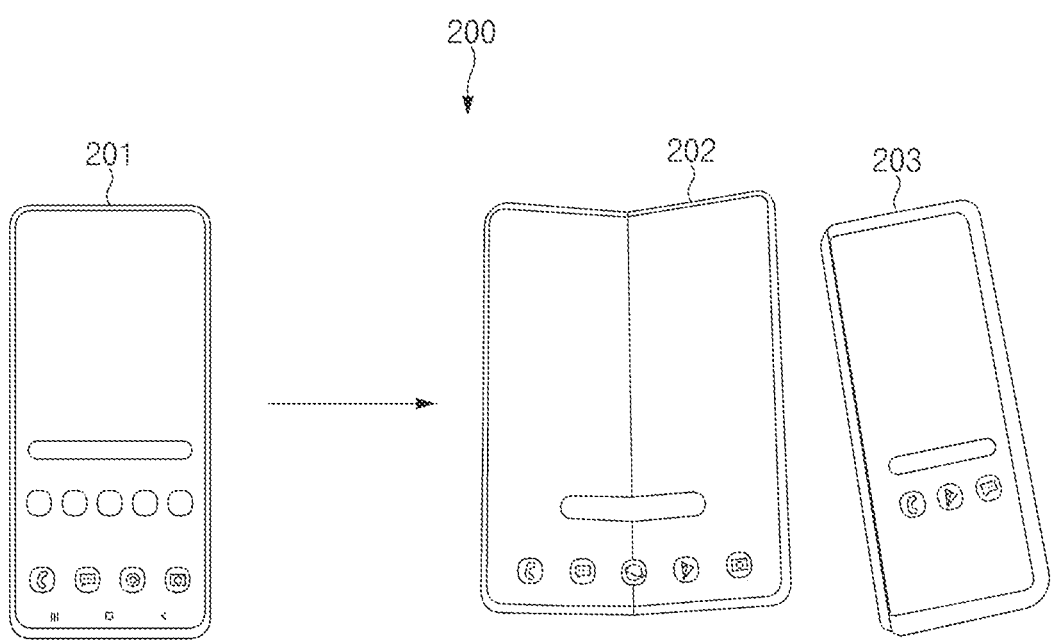
FIG. 2 is a drawing illustrating restoring a home screen of a first electronic device on a second electronic device according to an embodiment.

FIG. 2 is a drawing 200 illustrating restoring a home screen of a first electronic device 201 on a second electronic device 202 or 203 according to an embodiment.

In an embodiment, the first electronic device 201 may be a smartphone. The first electronic device 201 may include a first display. The first display may be exposed through a front surface of the first electronic device 201. The first display may have a first structure. The first structure may be a structure showing one screen through the front surface of the first electronic device 201.

In an embodiment, the first electronic device 201 may display a first home screen as its home screen. The home screen may be a screen first displayed when the display of the electronic device is turned on. For example, the first home screen may be a screen displayed when the first display is turned on while changing from an idle state to a wake-up state when a user starts to use the first electronic device 201.

In an embodiment, the first home screen may include a plurality of pieces of content. The plurality of pieces of content may include a plurality of icons. The icon may indicate an application which is run on the first electronic device 201. For example, the first home screen may include the plurality of icons, such as a message icon running a message application, a camera icon running a camera application, and a gallery icon running a gallery application. When the user selects the icon, an application corresponding to the icon may be run.

In an embodiment, the first home screen may include at least one widget and/or a background screen. Information such as a keyword input window, weather, and time may be displayed by means of the at least one widget. The user may set an image and/or a photo to be displayed to a background screen on the home screen.

In an embodiment, the second electronic device 202 or 203 may be a foldable electronic device. The second electronic device 202 or 203 may include a second display. The second display may include the main screen 202 exposed through a front surface when the second electronic device 202 or 203 are unfolded and the front screen 203 exposed through the front surface when the second electronic device 202 or 203 is folded. The second display may have a second structure. The second structure may be a structure showing two separate screens by means of the main screen and the front surface.

In an embodiment, the second electronic device 202 or 203 may display a second home screen as its home screen. For example, the second home screen may be a screen displayed when the second display is turned on while changing from an idle state to a wake-up state when the user starts to use the second electronic device 202 or 203.

In an embodiment, in FIG. 2, the first electronic device 201 is exemplified as the smartphone and the second electronic device 202 or 203 is exemplified as the foldable electronic device. However, it is not limited thereto, and the first electronic device 201 and the second electronic device 202 or 203 may be two electronic devices with different structures. The first electronic device 201 and the second electronic device 202 or 203 may have displays of different structures. For example, the number of screens of the display of the first electronic device 201 and the number of screens of the display of the second electronic device 202 or 203 may differ from each other. For another example, the number of pages making up the screen of the display of the first electronic device 201 and the number of pages making up the screen of the display of the second electronic device 202 or 203 may differ from each other. For another example, the screen of the display of the first electronic device 201 and the screen of the display of the second electronic device 202 or 203 may differ in shape, size, length, and/or width from each other. For another example, the screen of the display of the first electronic device 201 and the screen of the display of the second electronic device 202 or 203 may differ in the ratio of width to length from each other.

In an embodiment, the first home screen may be restored to the second home screen. The plurality of pieces of content included in the first home screen may be restored on the second home screen. For example, the plurality of icons included in the first home screen may be displayed on the second home screen without omission. At least one widget included in the first home screen may be displayed on the second home screen while maintaining its contents. The first home screen displayed on the first electronic device 201 may be displayed on the first display having the first structure, and the second home screen displayed on the second electronic device 202 or 203 may be displayed on the second display having the second structure. Various methods for restoring and displaying a home screen on displays having different structures are applicable.

Figure 3:
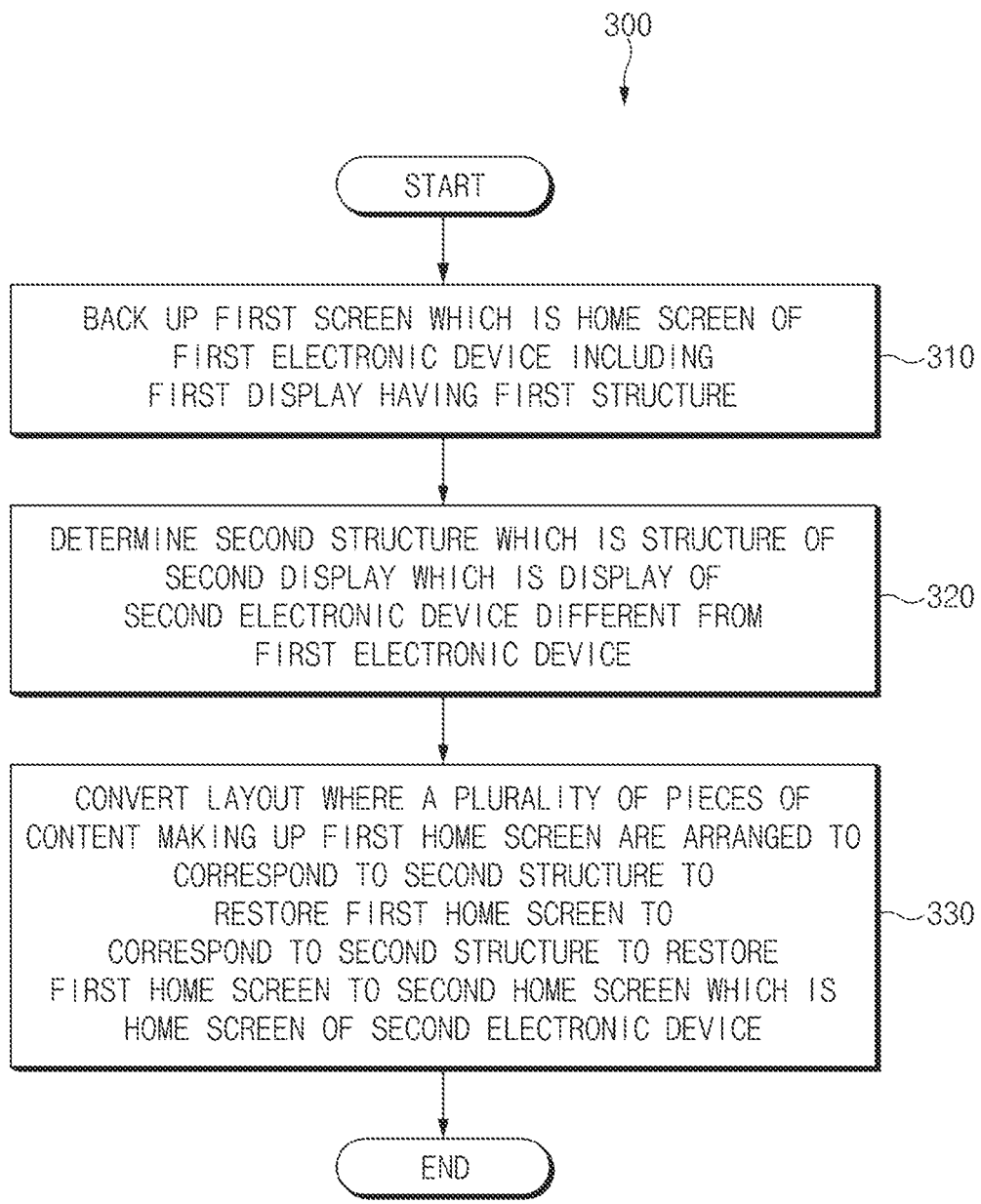
FIG. 3 is a flowchart illustrating a method for restoring a home screen of an electronic device according to an embodiment.

FIG. 3 is a flowchart 300 illustrating a method for restoring a home screen of an electronic device (e.g., an electronic device 101 of FIG. 1) according to an embodiment.

In operation 310, the method for restoring the home screen of the electronic device 101 according to an embodiment may back up a first screen which is a home screen of a first electronic device (e.g., a first electronic device 201 of FIG. 2) including a first display having a first structure. Home screen data associated with a plurality of pieces of content included in a first home screen may be stored. For example, a plurality of icons and/or at least one widget included in the first home screen may be stored as the home screen data. The home screen data may be stored in a memory (e.g., a memory 130 of FIG. 1) of the electronic device 101. The home screen data may be backed up to a server (e.g., a server 108 of FIG. 1) using communication circuitry (e.g., a communication module 190 of FIG. 1). For example, the home screen data may be backed up on a cloud.

In operation 320, the method for restoring the home screen of the electronic device 101 according to an embodiment may determine a second structure which is a structure of a second display which is a display of a second electronic device (e.g., a second electronic device 202 or 203 of FIG. 2) different from the first electronic device 201. The second structure may include information associated with the number of screens of the second display, the number of pages of the second display, or a shape, size, length, and/or width of the screen of the second display. For example, the second structure may include information associated with a smartphone structure where the second display has one screen and/or a multi-screen electronic device structure where the second display has a plurality of screens. The multi-screen electronic device structure may include a foldable electronic device structure where the second display has two screens, a rollable electronic device structure where the second display has a plurality of pages, or a multi-foldable electronic device structure where the second display has three or more screens. For another example, the second structure may include information associated with whether the ratio of width to length of the screen of the second display is a ratio where the plurality of icons are arranged at 4×6, is a ratio where the plurality of icons are arranged at 6×5, or is another ratio. The second structure may be determined using structure data stored in a memory of the second electronic device 202 or 203.

In operation 330, the method for restoring the home screen of the electronic device 101 according to an embodiment may convert a layout where the plurality of pieces of content making up the first home screen are arranged to correspond to the second structure to restore the first home screen to a second home screen which is a home screen of the second electronic device 202 or 203. The second home screen may include all the plurality of pieces of content included in the first home screen. A grid which is the entire shape of the second home screen may be similar to a grid of the first home screen. The plurality of pieces of content included in the first home screen may be rearranged to correspond to the second structure to be restored to the second home screen. For example, the arrangement of the plurality of icons included in the first home screen, a number where the plurality of icons are arranged, and/or an interval between the plurality of icons may be adjusted to suit the second structure to be restored to the second home screen. For another example, a shape may be changed while maintaining contents of the plurality of pieces of content included in the first home screen or at least some of the plurality of pieces of content may be selected to be restored to the second home screen to suit the second structure.

Figure 4:
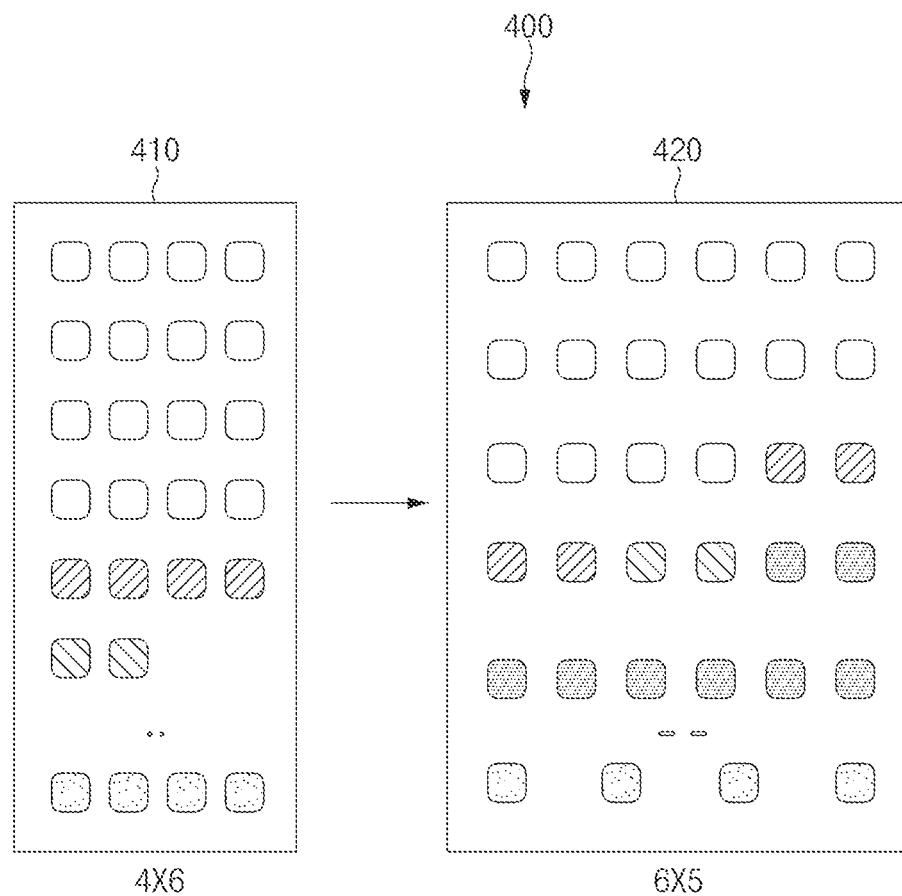
FIG. 4 is a drawing illustrating a method for restoring a home screen including a plurality of icons according to an embodiment.

FIG. 4 is a drawing 400 illustrating a method for restoring a home screen including a plurality of icons according to an embodiment.

In an embodiment, a first display of a first electronic device (e.g., a first electronic device 201 of FIG. 2) may display a first home screen 410. The first home screen 410 may have a ratio where the plurality of icons are arranged at 4×6. The first home screen 410 may have the smallest remaining space of the display when the plurality of icons are arranged at 4×6. The first home screen 410 may have the highest aesthetics users feel when the plurality of icons are arranged at 4×6.

In an embodiment, a second display of a second electronic device (e.g., a second electronic device 202 or 203 of FIG. 2) may display a second home screen 420. The second home screen 420 may have a ratio where the plurality of icons are arranged at 6×5. The second home screen 420 may have the smallest remaining space of the display when the plurality of icons are arranged at 6×5. The second home screen 420 may have the highest aesthetics users feel when the plurality of icons are arranged at 6×5.

In an embodiment, the second electronic device 202 or 203 may allow a layout of the first home screen 410 to correspond to a second structure to be restored to the second home screen 420. The second electronic device 202 or 203 may allow the layout of the first home screen 410 to correspond to a resolution of the second display to be restored to the second home screen 420. The second electronic device 202 or 203 may reflect a default grid corresponding to a second structure of the second display to be restored to the second home screen 420.

In an embodiment, the second electronic device 202 or 203 may provide an icon it is impossible to back up among the plurality of icons included in the first home screen 410 in a stub scheme. For example, the second electronic device 202 or 203 may replace and provide an application corresponding to the icon it is impossible to back up among the plurality of icons included in the first home screen 410 with a connection icon. When a user selects the connection icon, he or she may be connected to an application store capable of downloading the application corresponding to the icon it is impossible to back up. For another example, the second electronic device 202 or 203 may replace and provide an application corresponding to the icon it is impossible to back up among the plurality of icons included in the first home screen 410 with a download icon. When the user selects the download icon, he or she may immediately download the application corresponding to the icon it is impossible to back up.

Figure 5:
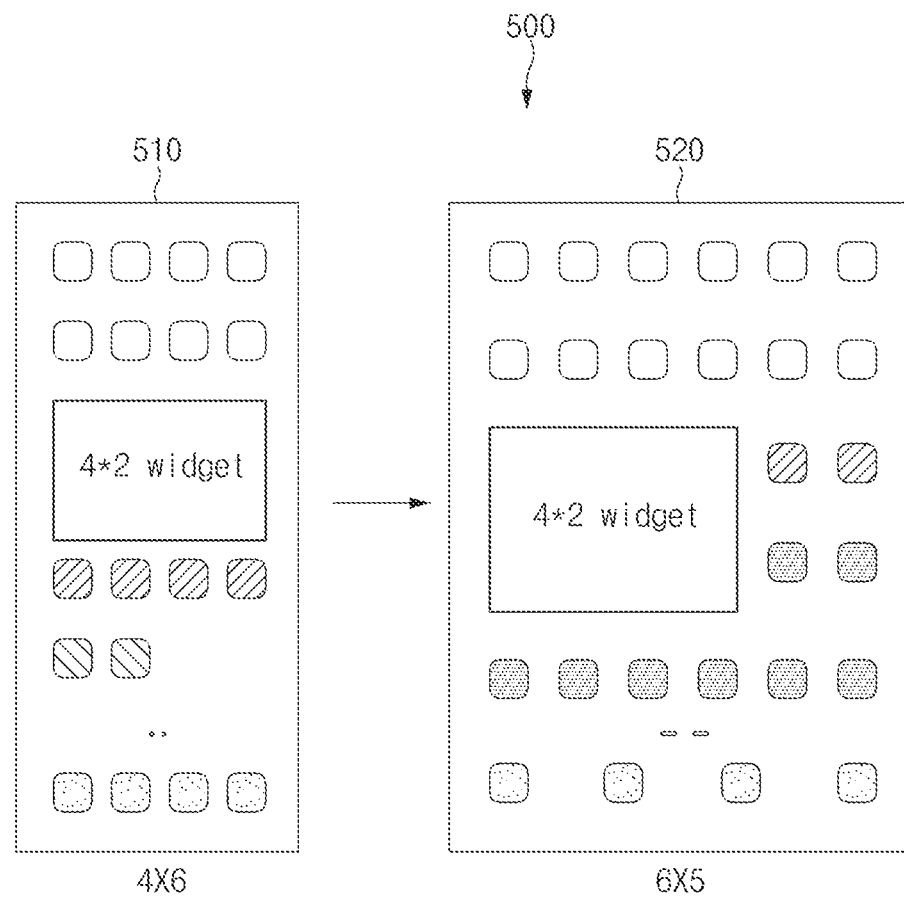
FIG. 5 is a drawing illustrating a method for restoring a home screen of an electronic device, including a plurality of icons and a widget according to an embodiment.

FIG. 5 is a drawing 500 illustrating a method for restoring a home screen of an electronic device, including a plurality of icons and a widget, according to an embodiment.

In an embodiment, a first display of a first electronic device (e.g., a first electronic device 201 of FIG. 2) may display a first home screen 510. The first home screen 510 may include a widget having a 4×2 size when a horizontal length and/or a vertical length of the icon is 1. The widget may be disposed on the other area except for an area where a plurality of icons are arranged. For example, the widget may be disposed between two areas where the plurality of icons are arranged.

In an embodiment, a second display of a second electronic device (e.g., a second electronic device 202 or 203 of FIG. 2) may display a second home screen 520. The widget having the 4×2 size may be restored on the second home screen 520. The widget may be disposed on the other area except for the area where the plurality of icons are arranged. For example, the widget may be disposed on a left-center area where the icons are not disposed.

In an embodiment, the first home screen 510 may be restored to the second home screen 520 while maintaining a size of the widget included in the first home screen 510 and/or a grid. The first home screen 510 may be restored to the second home screen 520 while maintaining contents of content included in the widget included in the first home screen 510.

In an embodiment, the first home screen 510 may be restored to the second home screen 520 while changing a location of the widget and/or an arrangement relationship between the plurality of icons, which are included in the first home screen 510, to correspond to a second structure of the second display. The first home screen 510 may be restored to the second home screen 420 while changing a shape and/or a design of content included in the widget included in the first home screen 510 to correspond to the second structure of the second display.

Figure 6:
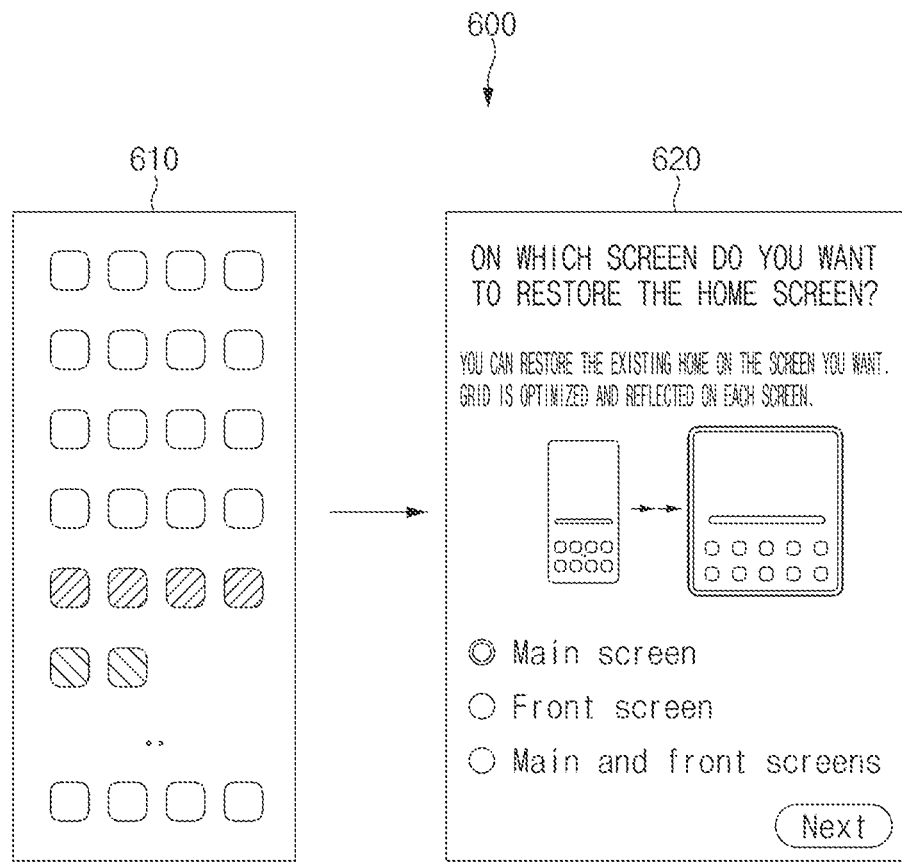
FIG. 6 is a drawing illustrating a method for restoring a home screen of an electronic device on a main screen of a foldable electronic device according to an embodiment.

FIG. 6 is a drawing 600 illustrating a method for restoring a home screen 610 of an electronic device (e.g., a first electronic device 201 of FIG. 2) on a main screen (e.g., a main screen 202 of FIG. 2) of a foldable electronic device (e.g., a second electronic device 202 or 203 of FIG. 2) according to an embodiment.

In an embodiment, the foldable electronic device 202 or 203 may display an area option screen 620 after determining a second structure. The area option screen 620 may be a screen for selecting whether to apply a second home screen to any area of a second display.

In an embodiment, the area option screen 620 may identify whether to restore a home screen 610 on any screen. The area option screen 620 may display guidance capable of restoring the home screen 610 on a screen a user wants. The area option screen 620 may display guidance capable of changing a grid and/or a layout to correspond to a structure of a screen to be restored.

In an embodiment, when the main screen 202 is selected on the area option screen 620, the foldable electronic device 202 or 203 may restore the home screen 610 to a second home screen on the main screen 202. The main screen 202 may be a screen displayed when the foldable electronic device 202 or 203 is unfolded. The home screen 610 may be converted into a layout corresponding to a structure of the main screen 202 to be restored to the second home screen. The restored second home screen may be displayed on the main screen 202 of the foldable electronic device 202 or 203.

Figure 7:
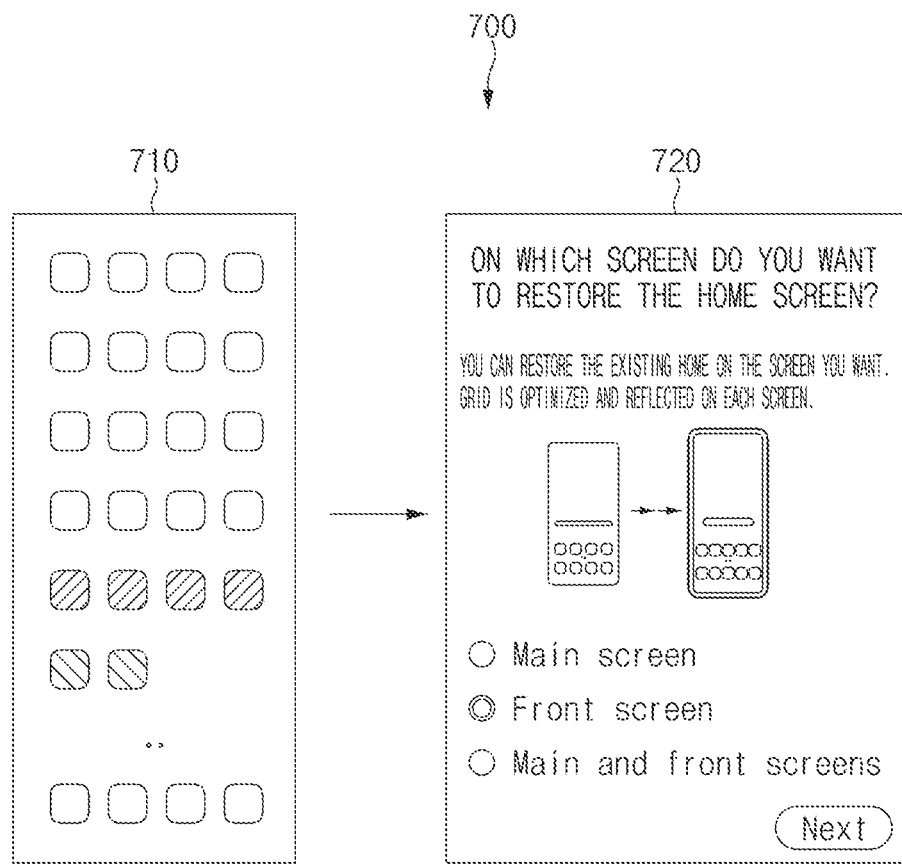
FIG. 7 is a drawing illustrating a method for restoring a home screen of an electronic device on a front screen of a foldable electronic device according to an embodiment.

FIG. 7 is a drawing 700 illustrating a method for restoring a home screen 710 of an electronic device (e.g., a first electronic device 201 of FIG. 2) on a front screen (e.g., a front screen 203 of FIG. 2) of a foldable electronic device (e.g., a second electronic device 202 or 203 of FIG. 2) according to an embodiment.

In an embodiment, when the front screen 203 is selected on an area option screen 720, the foldable electronic device 202 or 203 may restore a home screen 710 to a second home screen on the front screen 203. The front screen 203 may be a screen displayed when the foldable electronic device 202 or 203 is folded. The home screen 710 may be converted into a layout corresponding to a structure of the front screen 203 to be restored to the second home screen. The restored second home screen may be displayed on the front screen 203 of the foldable electronic device 202 or 203.

Figure 8:
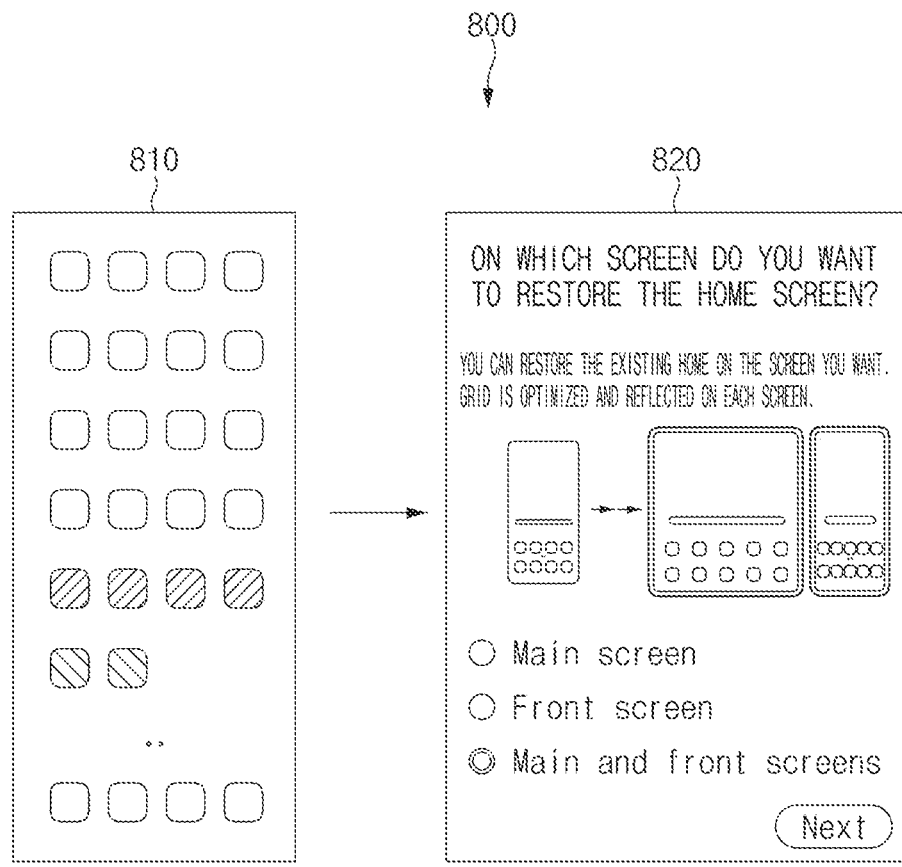
FIG. 8 is a drawing illustrating a method for restoring a home screen of an electronic device on a main screen and a front screen of a foldable electronic device according to an embodiment.

FIG. 8 is a drawing 800 illustrating a method for restoring a home screen 810 of an electronic device (e.g., a first electronic device 201 of FIG. 2) on a main screen (e.g., a main screen 202 of FIG. 2) and a front screen (e.g., a front screen 203 of FIG. 2) of a foldable electronic device (e.g., a second electronic device 202 or 203 of FIG. 2) according to an embodiment.

In an embodiment, when the main screen 202 and the front screen 203 are selected on an area option screen 820, the foldable electronic device 202 or 203 may restore the home screen 810 to a second home screen on each of the main screen 202 and the front screen 203. The home screen 710 may be converted into a layout corresponding to a structure of each of the main screen 202 and the front screen 203 to be restored to the second home screen. The restored second home screen may be displayed on each of the main screen 202 and the front screen 203 of the foldable electronic devices 202 and 203.

Figure 9:
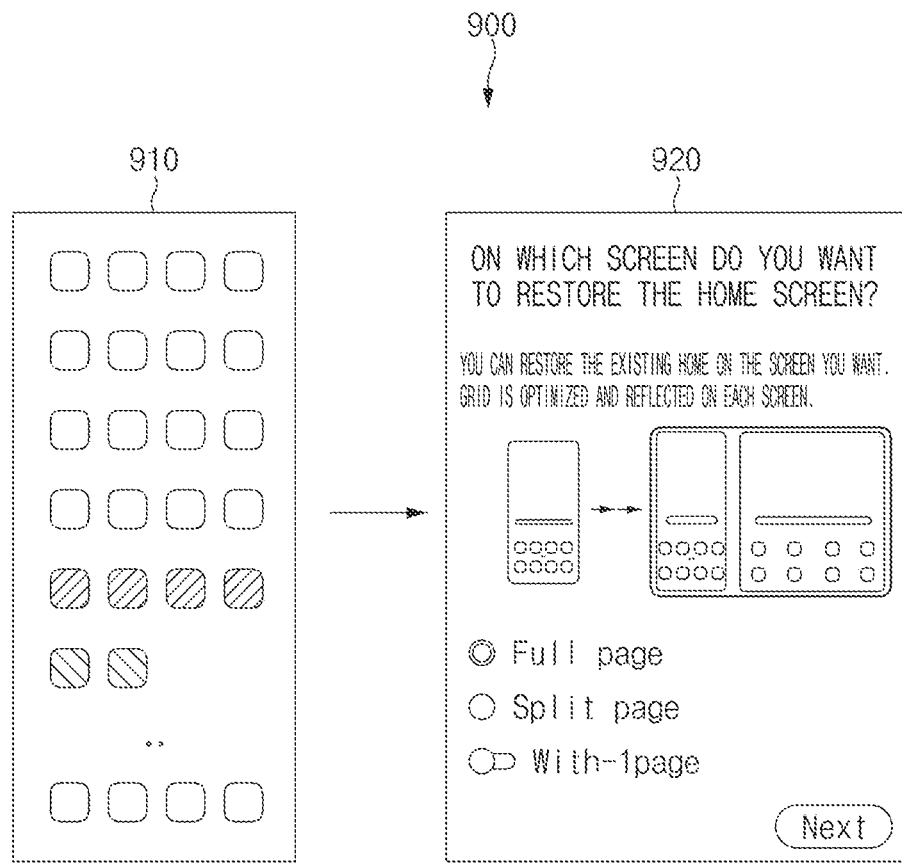
FIG. 9 is a drawing illustrating a method for restoring a home screen of an electronic device on a full page of a rollable electronic device according to an embodiment.

FIG. 9 is a drawing 900 illustrating a method for restoring a home screen 910 of an electronic device (e.g., a first electronic device 201 of FIG. 2) on a full page of a rollable electronic device (e.g., a second electronic device) according to an embodiment.

In an embodiment, the rollable electronic device may be an electronic device, a display of which is expanded while protruding from a housing. A second display of the rollable electronic device may change in size. The second display may have at least one page. For example, the full page may be configured by being added to an area where the second display of the rollable electronic device changes in size. For another example, an area where the second display of the rollable electronic device changes in size may be configured as a separate page.

In an embodiment, when the full page is selected on an area option screen 910, the rollable electronic device may restore the home screen 910 on the full page. The home screen 910 may be converted into a layout corresponding to a structure of the full page to be restored to a second home screen. The restored second home screen may be displayed on the full page of the rollable electronic device. The home screen 910 may be restored to the second home screen having one page to be displayed to occupy the entire expanded second display.

Figure 10:
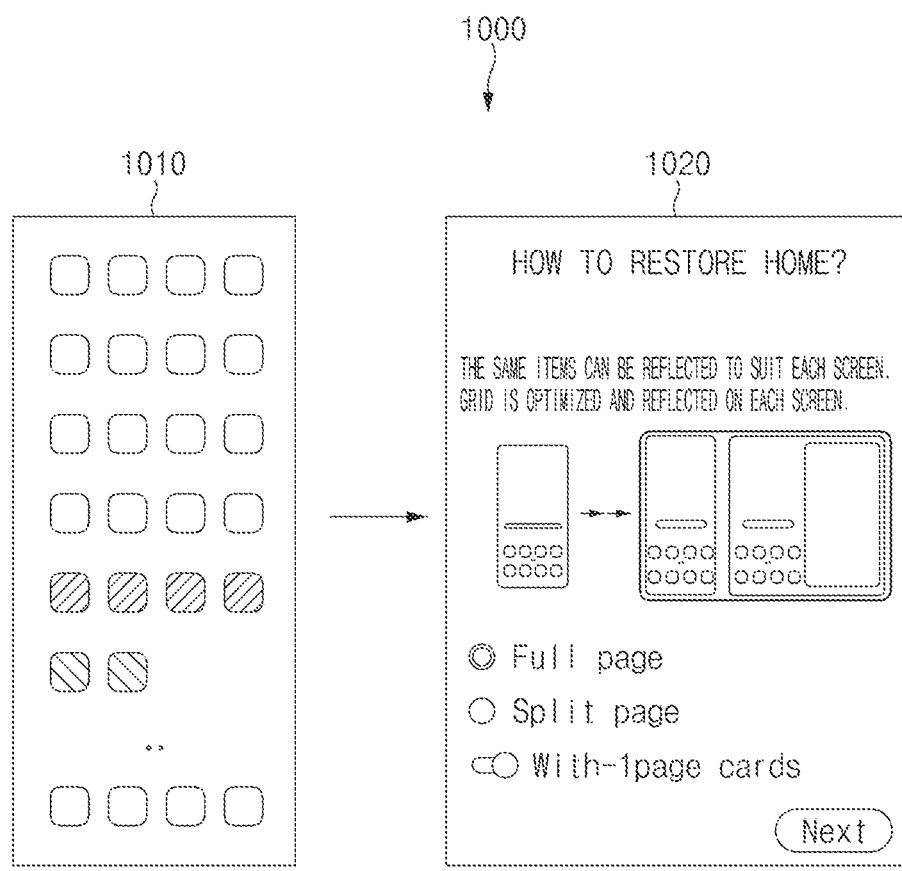
FIG. 10 is a drawing illustrating a method for restoring a home screen of an electronic device, including a page card, on a full page of a rollable electronic device according to an embodiment.

FIG. 10 is a drawing 1000 illustrating a method for restoring a home screen 1010 of an electronic device (e.g., a first electronic device 201 of FIG. 2), including a page card, on a full screen of a rollable electronic device (e.g., a second electronic device) according to an embodiment.

In an embodiment, when the full page is selected on an area option screen 1020, the rollable electronic device may restore the home screen 1010 on the full page.

In an embodiment, the area option screen 1020 may display a button selecting whether to include a page card in the full page. A user may select whether to include the page card in the full page on the area option screen 1020. When the button is selected to include the page card in the full page, a second home screen may include the page card.

In an embodiment, the page card may be a component which displays content in the form of a card in one page. Information such as news, notification, weather, update, or a state of the electronic device may be displayed on the page card.

Figure 11:
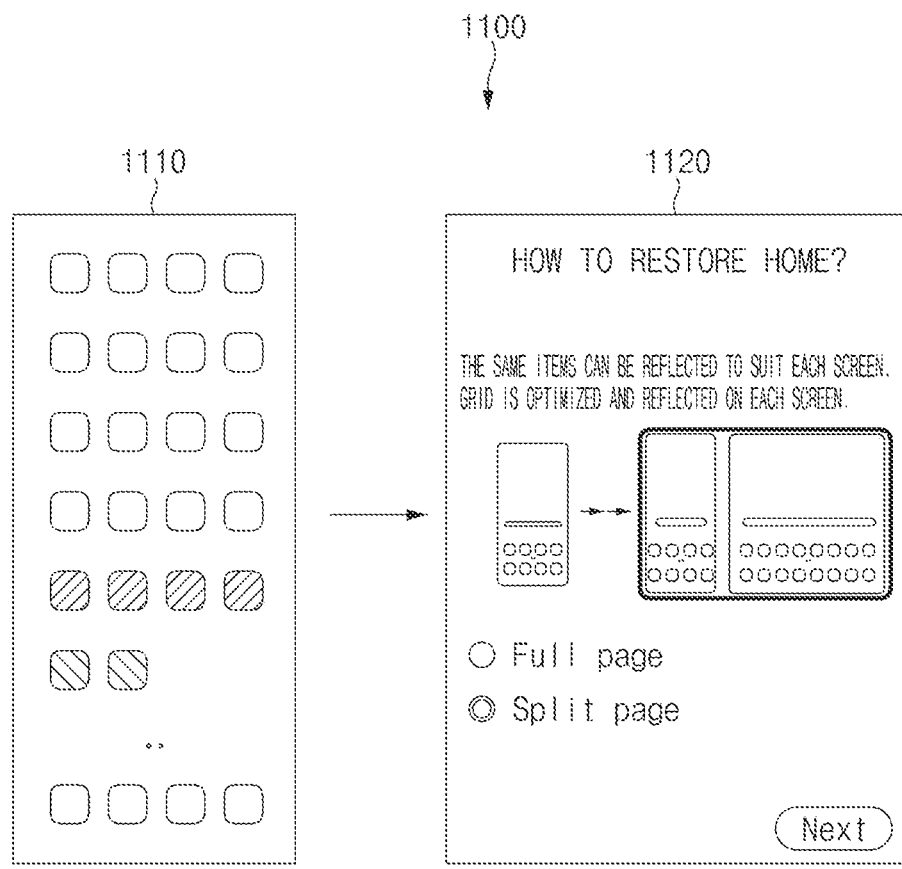
FIG. 11 is a drawing illustrating a method for restoring a home screen of an electronic device on a split page of a rollable electronic device according to an embodiment.

FIG. 11 is a drawing 1100 illustrating a method for restoring a home screen 1110 of an electronic device (e.g., a first electronic device 201 of FIG. 2) on a split page of a rollable electronic device (e.g., a second electronic device) according to an embodiment.

In an embodiment, when the split page is selected on an area option screen 1120, the rollable electronic device may restore the home screen 1110 on a page-by-page basis. A second home screen may be displayed on a page-by-page basis.

In an embodiment, when a second display is expanded to greater than or equal to a length capable of restoring a plurality of pages, the split page may be selected on the area option screen 1120. The second home screen may be restored to a layout corresponding to an extent and/or a width of the area where the second display is expanded.

Figure 12:
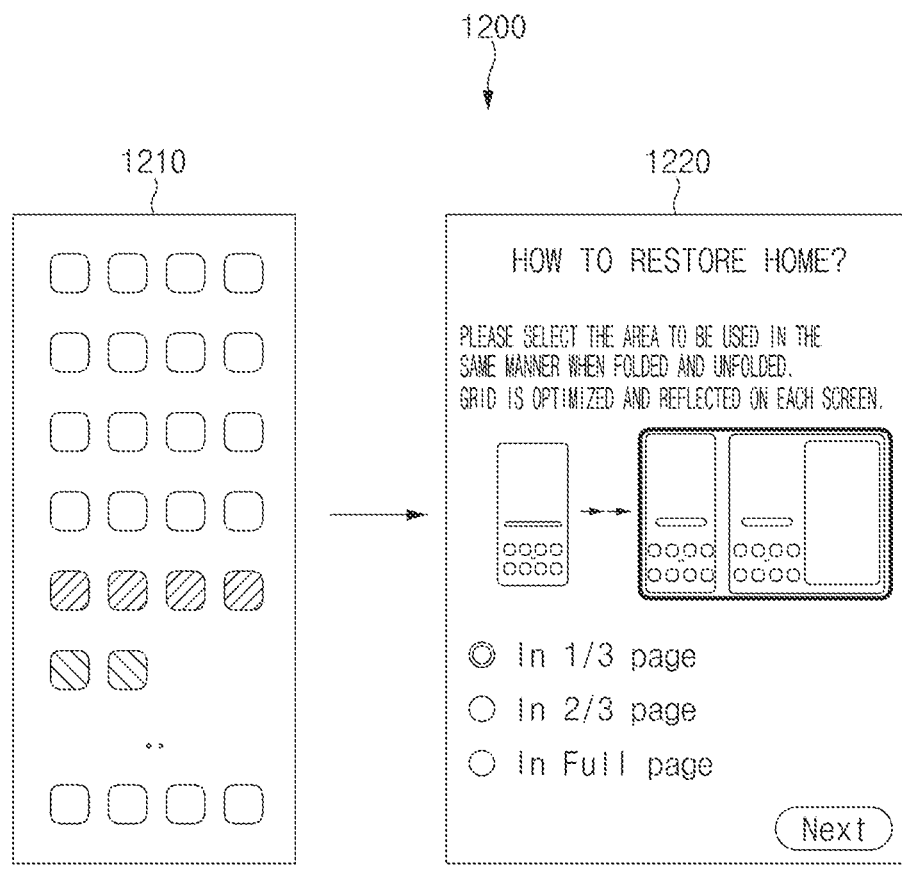
FIG. 12 is a drawing illustrating a method for restoring a home screen of an electronic device on a first page of a multi-foldable electronic device according to an embodiment.

FIG. 12 is a drawing 1200 illustrating a method for restoring a home screen 1210 of an electronic device (e.g., a first electronic device 201 of FIG. 2) on a first page of a multi-foldable electronic device (e.g., a second electronic device) according to an embodiment.

In an embodiment, the multi-foldable electronic device may be an electronic device, a display of which is able to be folded or unfolded a plurality of times. A second display of the multi-foldable electronic device may have three or more pages.

In an embodiment, when the first page is selected on an area option screen 1220, the multi-foldable electronic device may restore the home screen 1210 on the first page. The home screen 1210 may be converted into a layout corresponding to a structure of the first page to be restored to a second home screen. The restored second home screen may be displayed to correspond to the first page of the multi-foldable electronic device. The other pages except for the first page may remain as a spare space or an additional area. A user may use the additional area to correspond to usability of the multi-foldable electronic device.

Figure 13:
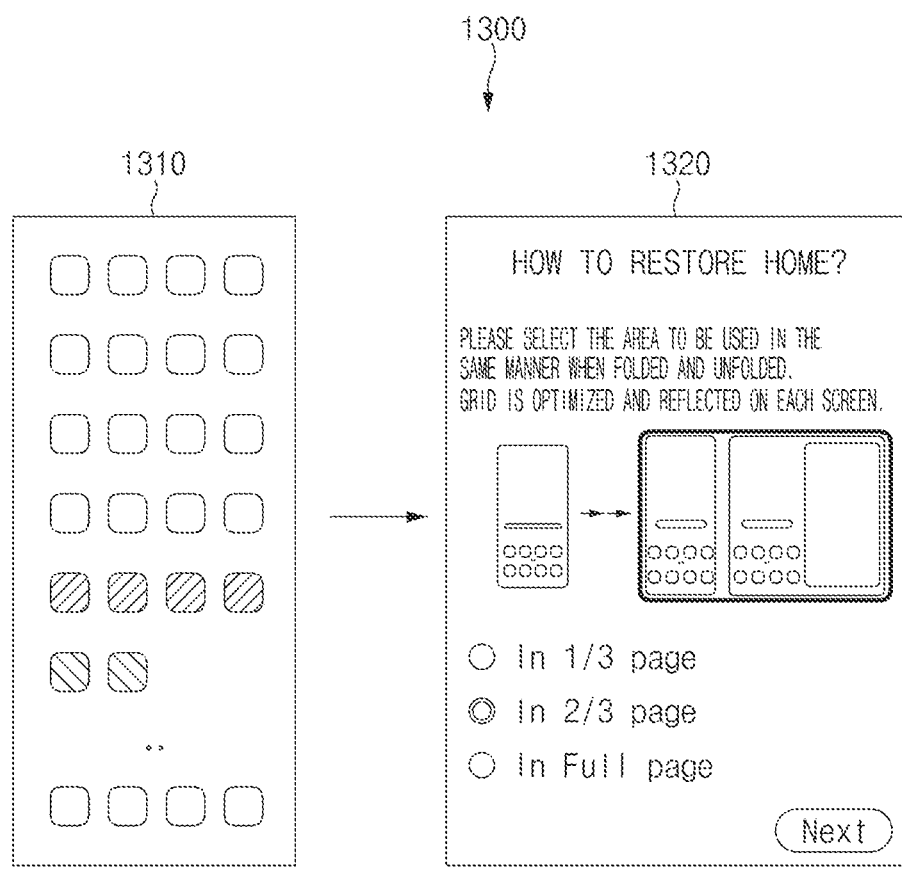
FIG. 13 is a drawing illustrating a method for restoring a home screen of an electronic device on a first page and a second page of a multi-foldable electronic device according to an embodiment.

FIG. 13 is a drawing 1300 illustrating a method for restoring a home screen 1310 of an electronic device (e.g., a first electronic device 201 of FIG. 2) on a first page and a second page of a multi-foldable electronic device (e.g., a second electronic device) according to an embodiment.

In an embodiment, when the second page is selected on an area option screen 1320, the multi-foldable electronic device may restore the home screen 1310 on the first page and the second page. The home screen 1310 may be converted into a layout corresponding to structures of the first page and the second page to be restored to a second home screen. The restored second home screen may be displayed to correspond to the first page and the second of the multi-foldable electronic device. The other pages except for the first page and the second page may remain as a spare space or an additional area. A user may use the additional area to correspond to usability of the multi-foldable electronic device.

Figure 14:
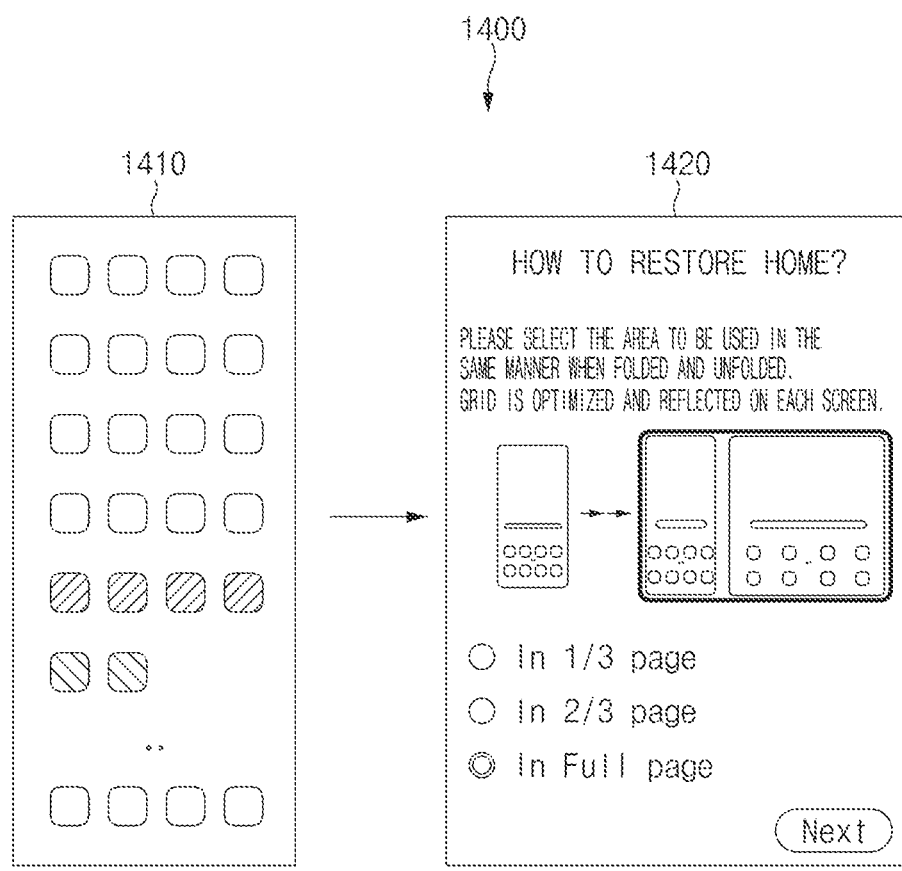
FIG. 14 is a drawing illustrating a method for restoring a home screen of an electronic device on a first page, a second page, and a third page of a multi-foldable electronic device according to an embodiment.

FIG. 14 is a drawing 1400 illustrating a method for restoring a home screen 1410 of an electronic device (e.g., a first electronic device 201 of FIG. 2) on a first page, a second page, and a third page of a multi-foldable electronic device (e.g., a second electronic device) according to an embodiment.

In an embodiment, when a full page is selected on an area option screen 1420, the multi-foldable electronic device may restore the home screen 1410 on the first page, the second page, and the third page. The home screen 1410 may be converted into a layout corresponding to structures of the first page, the second page, and the third page to be restored to a second home screen. The restored second home screen may be displayed to correspond to the first page, the second page, and the third page of the multi-foldable electronic device. Thus, the home screen 1410 may be restored to the second home screen to occupy the entire area of a second display of the multi-foldable electronic device.

In an embodiment, each page for each area of the home screen 1410 are backed up in order to be restored to the second home screen. Each page for each area of the home screen 1410 may be split on the basis of a folded portion of the multi-foldable electronic device to be restored to the second home screen.

Figure 15:
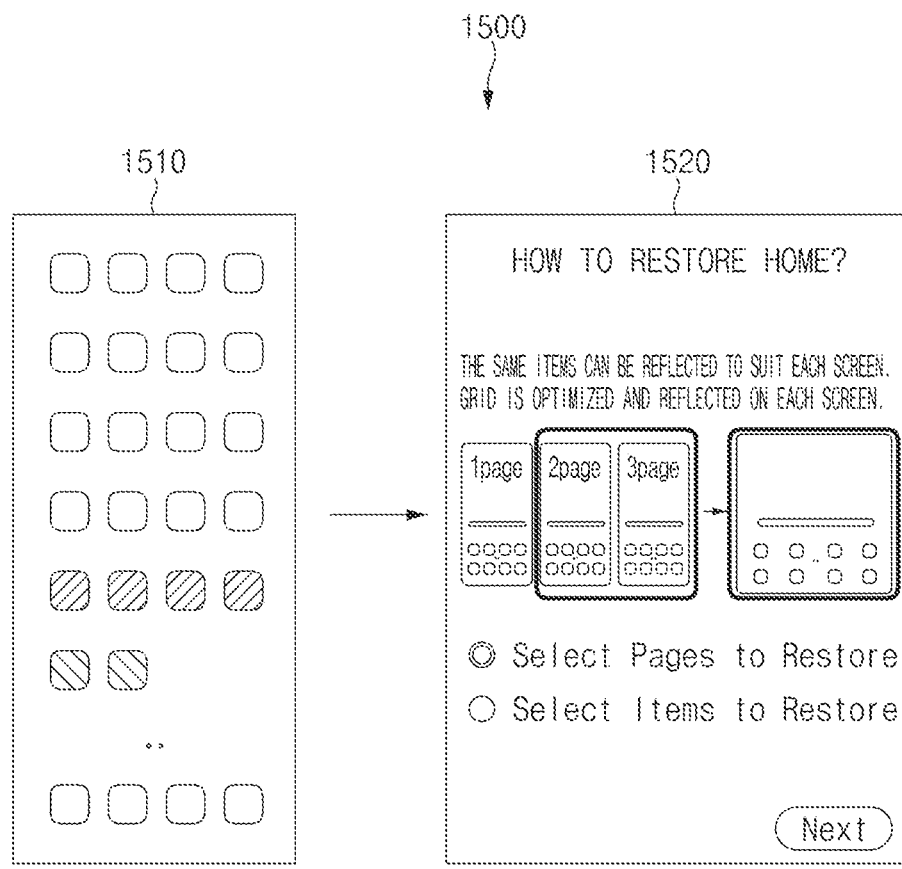
FIG. 15 is a drawing illustrating a method for restoring a page selected in a home screen of a first electronic device on a second electronic device according to an embodiment.

FIG. 15 is a drawing 1500 illustrating a method for restoring a page selected in a home screen 1510 of a first electronic device (e.g., a first electronic device 201 of FIG. 2) on a second electronic device according to an embodiment.

In an embodiment, a second structure of a second display included in the second electronic device may be determined to display a page option screen 1520. The page option screen 1520 may be to select whether to restore any of a plurality of pages making up the first home screen 1510. For example, when the first home screen 1510 includes three pages, it may be selected whether to restore any of a first page, a second page, and a third page of the first home screen 1510 to a second home screen. When a user selects the second page and the third page, they may be restored to the second home screen using a plurality of pieces of content included in the second page and the third page. A layout of the plurality of pieces of content included in the second page and the third page may be changed to correspond to a second structure to be restored to the second home screen.

Figure 16:
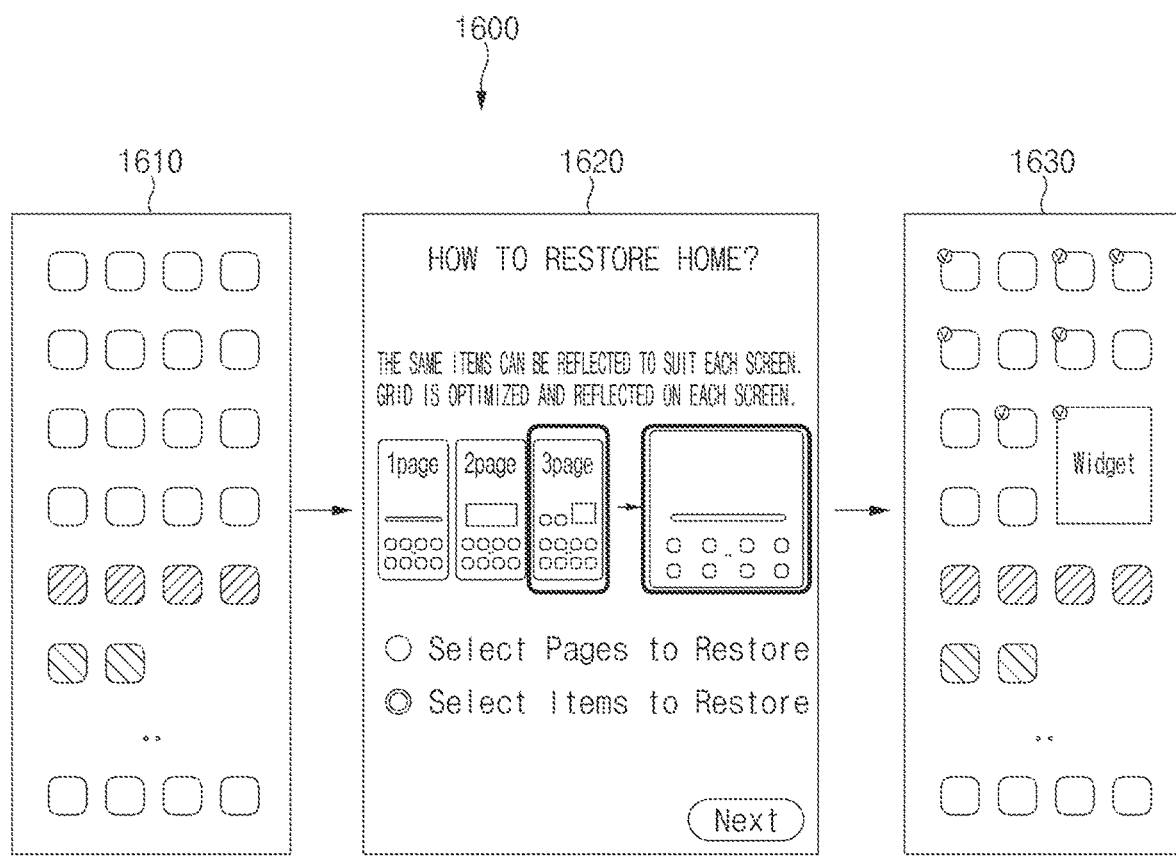
FIG. 16 is a drawing illustrating a method for restoring content selected in a home screen of a first electronic device on a second electronic device according to an embodiment.

FIG. 16 is a drawing 1600 illustrating a method for restoring content selected in a home screen 1610 of a first electronic device (e.g., a first electronic device 201 of FIG. 2) on a second electronic device according to an embodiment.

In an embodiment, a second structure of a second display included in the second electronic device may be determined to display a content option screen 1620. The content option screen 1620 may be to select whether to restore any of a plurality of pieces of content making up the first home screen 1610. For example, when selecting a menu for selecting content on a content option screen 1620 and restoring a second home screen, the second electronic device may display a content selection screen 1630. The content selection screen 1630 may be to separately select whether to restore any of a plurality of pieces of content included in the first home screen 1610 to the second screen. For example, icons and a widget to be restored to the second home screen among a plurality of icons and at least one widget included in the first home screen 1610 may be selected to be checked on the content selection screen 1630. The first home screen 1610 may be restored to the second home screen using pieces of content checked on the content selection screen 1630. A layout of pieces of content checked on the content selection screen 1630 may be changed to correspond to a second structure to be restored to the second home screen.

Figure 17:
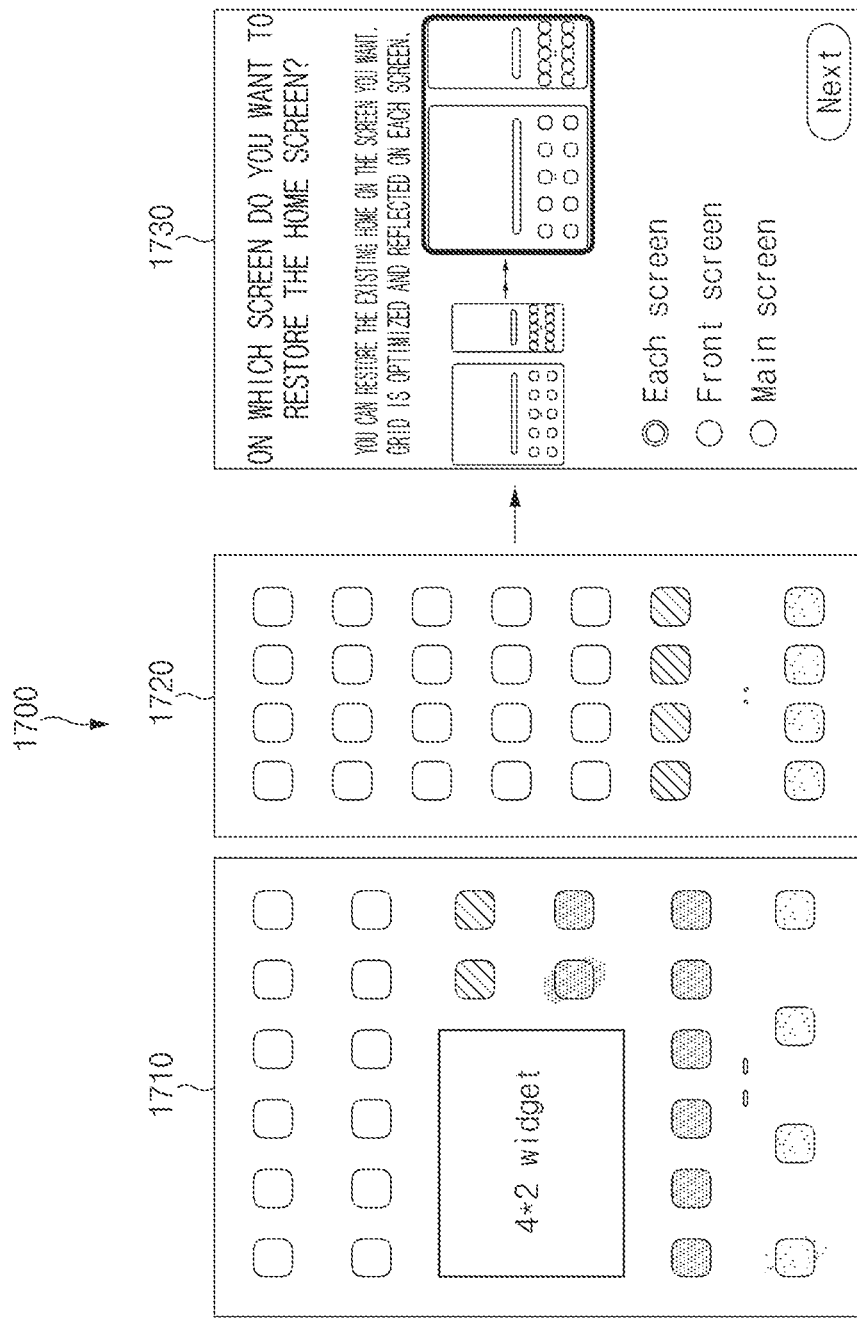
FIG. 17 is a drawing illustrating a method for restoring a home screen of a first foldable electronic device on a main screen and a front screen of a second foldable electronic device according to an embodiment.

FIG. 17 is a drawing 1700 illustrating a method for restoring home screens 1710 and 1720 of a first foldable electronic device (e.g., a first electronic device) on a main screen (e.g., a main screen 202) and a front screen (e.g., a front screen 203) of a second foldable electronic device (e.g., a second electronic device) according to an embodiment.

In an embodiment, the first electronic device which displays a first home screen to be backed up may be a foldable electronic device. The first foldable electronic device may display the home screens 1710 and 1720 on the main screen 1710 and the front screen 1720.

In an embodiment, when each screen is selected on an area option screen 1730, the second foldable electronic device may restore the home screens 1710 and 1720 to the main screen 202 and the front screen 203, respectively. The home screen 1710 and 1720 may be converted into layouts respectively corresponding to the main screen 202 and the front screen 203 to be restored to the second home screen. The restored second home screen may be displayed to correspond to the main screen 202 and the front screen 203 of the second foldable electronic device.

Figure 18:
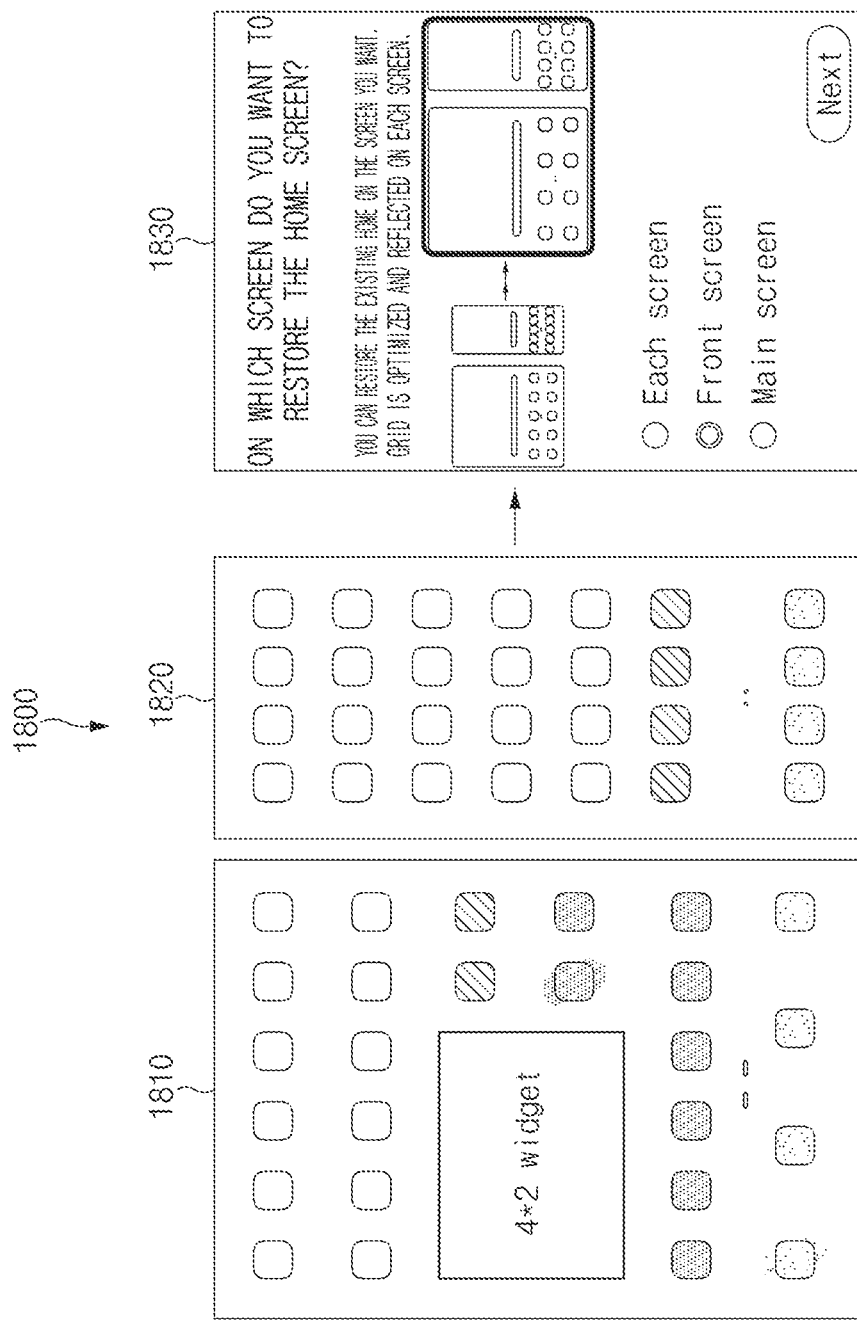
FIG. 18 is a drawing illustrating a method for restoring a home screen of a first foldable electronic device on a front screen of a second foldable electronic device according to an embodiment.

FIG. 18 is a drawing 1800 illustrating a method for restoring home screens 1810 and 1820 of a first foldable electronic device (e.g., a first electronic device) on a front screen (e.g., a front screen 203) of a second foldable electronic device (e.g., a second electronic device) according to an embodiment.

In an embodiment, the first electronic device which displays a first home screen to be backed up may be a foldable electronic device. The first foldable electronic device may display the home screens 1810 and 1820 on the main screen 1810 and the front screen 1820.

In an embodiment, when the front screen is selected on an area option screen 1830, the second foldable electronic device may restore the home screen 1820 displayed on the front screen to the front screen 203. The home screen 1820 displayed on the front screen may be converted into a layout corresponding to the front screen 203 to be restored to a second home screen. The restored second home screen may be displayed to correspond to the front screen 203 of the second foldable electronic device. The main screen 202 of the second foldable electronic device may be displayed as a default home screen.

Figure 19:
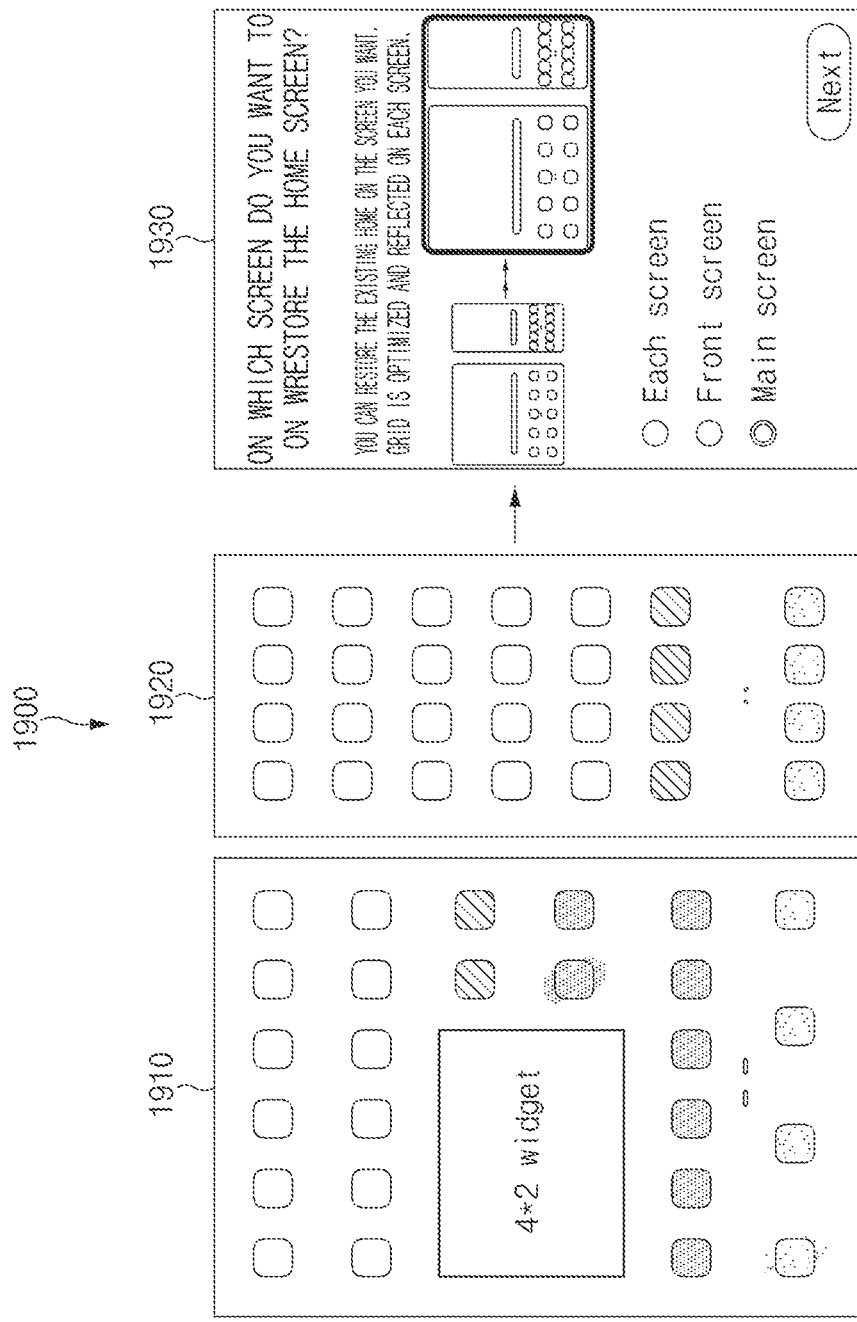
FIG. 19 is a drawing illustrating a method for restoring a home screen of a first foldable electronic device on a main screen of a second foldable electronic device according to an embodiment.

FIG. 19 is a drawing 1900 illustrating a method for restoring home screens 1910 and 1920 of a first foldable electronic device (e.g., a first electronic device) on a main screen (e.g., a main screen 202) of a second foldable electronic device according to an embodiment.

In an embodiment, the first electronic device which displays a first home screen to be backed up may be a foldable electronic device. The first foldable electronic device may display the home screens 1910 and 1920 on the main screen 1910 and the front screen 1920.

In an embodiment, when the main screen is selected on an area option screen 1930, the second foldable electronic device may restore the home screen 1910 displayed on the main screen on the main screen 202. The home screen 1910 displayed on the main screen may be converted into a layout corresponding to the main screen 202 to be restored to a second home screen. The restored second home screen may be displayed to correspond to the main screen 202 of the second foldable electronic device. The front screen 203 of the second foldable electronic device may be displayed as a default home screen.

Figure 20:
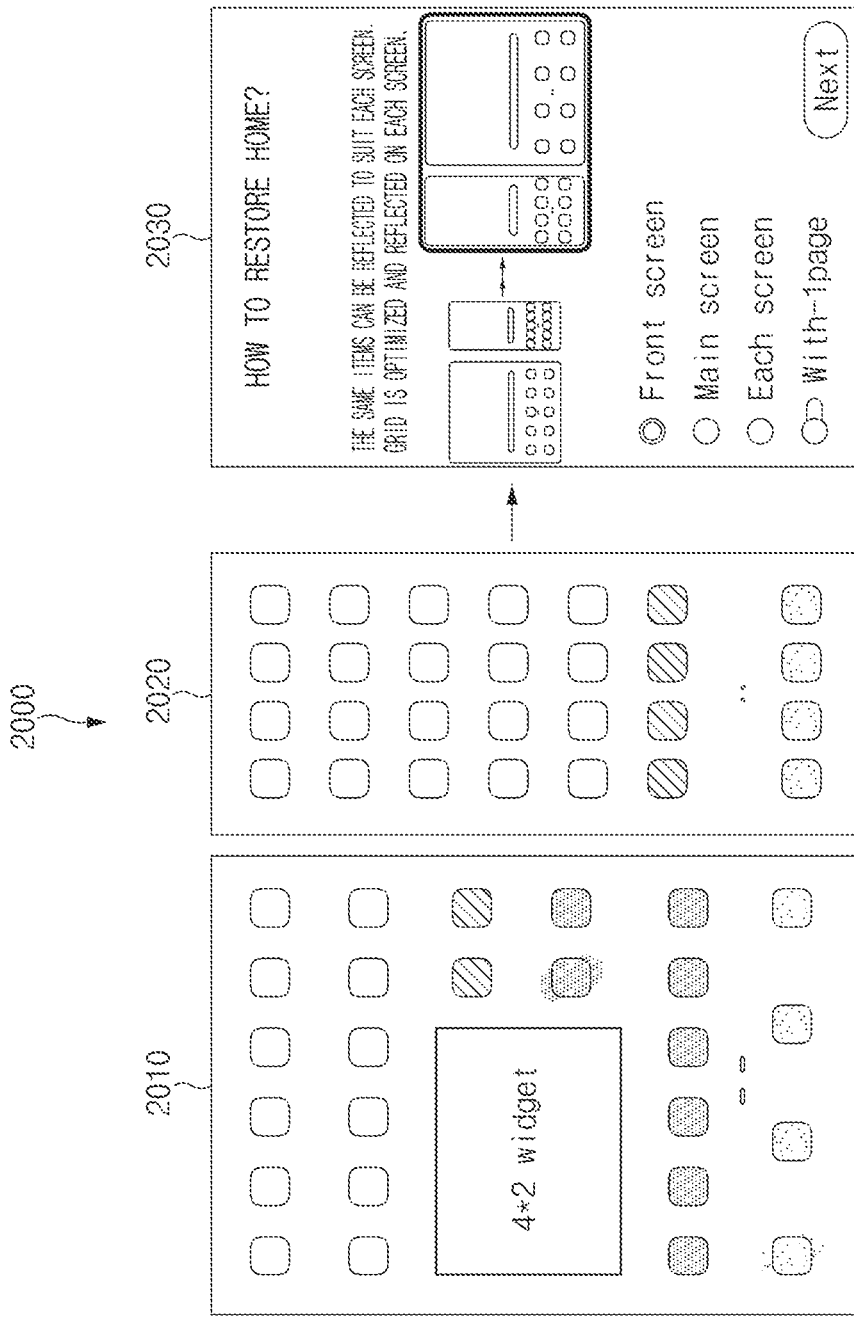
FIG. 20 is a drawing illustrating a method for restoring a home screen of a foldable electronic device on a front screen of a rollable electronic device according to an embodiment.

FIG. 20 is a drawing 2000 illustrating a method for restoring home screens 2010 and 2020 of a foldable electronic device (e.g., a first electronic device) on a front screen of a rollable electronic device (e.g., a second electronic device) according to an embodiment.

In an embodiment, the first electronic device which displays a first home screen to be backed up may be a foldable electronic device. The foldable electronic device may display the home screens 2010 and 2020 on the main screen 2010 and the front screen 2020.

In an embodiment, when the front screen is selected on an area option screen 2030, the rollable electronic device may restore the home screen 2020 displayed on the front screen to a second home screen. The home screen 2020 displayed on the front screen may be converted into a layout corresponding to a second display of the rollable electronic device to be restored to the second home screen. The restored second home screen may be displayed to correspond to the entire screen of the second display.

Figure 21:
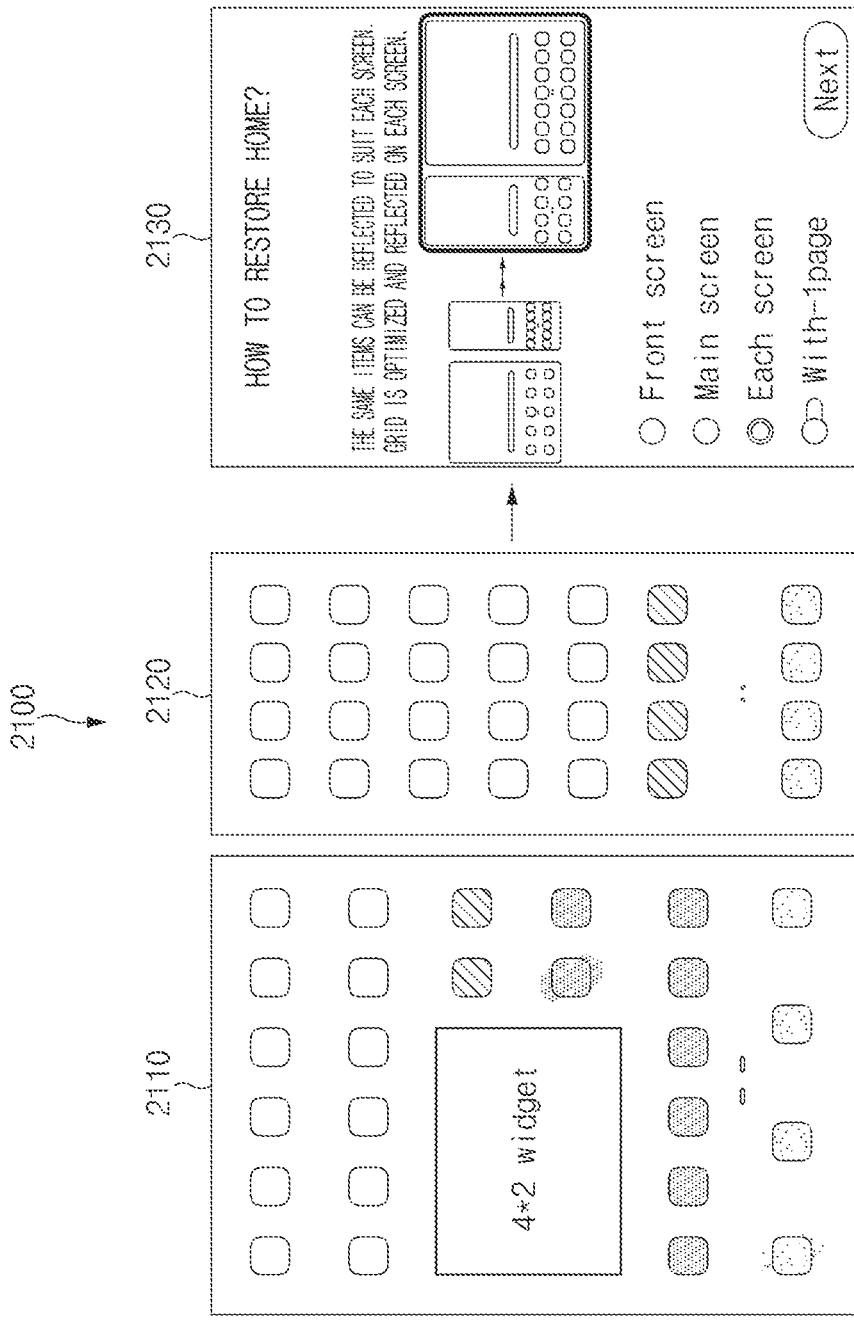
FIG. 21 is a drawing illustrating a method for restoring a home screen of a foldable electronic device on a front screen and a main screen of a rollable electronic device according to an embodiment.

FIG. 21 is a drawing 2100 illustrating a method for restoring home screens 2110 and 2120 of a foldable electronic device (e.g., a first electronic device) on a front screen and a main screen of a rollable electronic device (e.g., a second electronic device) according to an embodiment.

In an embodiment, the first electronic device which displays a first home screen to be backed up may be a foldable electronic device. The foldable electronic device may display the home screens 2110 and 2120 on the main screen 2110 and the front screen 2120.

In an embodiment, when each of the front screen and the main screen is selected on an area option screen 2130, the rollable electronic device may restore the home screen 2110 and 2120 respectively displayed on the front screen and the main screen to be restored to a second home screen. The home screen 2110 and 2120 displayed on the front screen and the main screen may be converted into a layout corresponding to a second display of the rollable electronic device to be restored to the second home screen.

In an embodiment, the restored second home screen may be displayed to correspond to the entire screen of the second display. The home screens 2110 and 2120 respectively displayed on the front screen and the main screen may be restored to the second home screen in an integrated manner. For example, the front screen 2120 may provide usability of the second electronic device, and the main screen 2110 may be restored to an additional home area included in the second electronic device.

Figure 22:
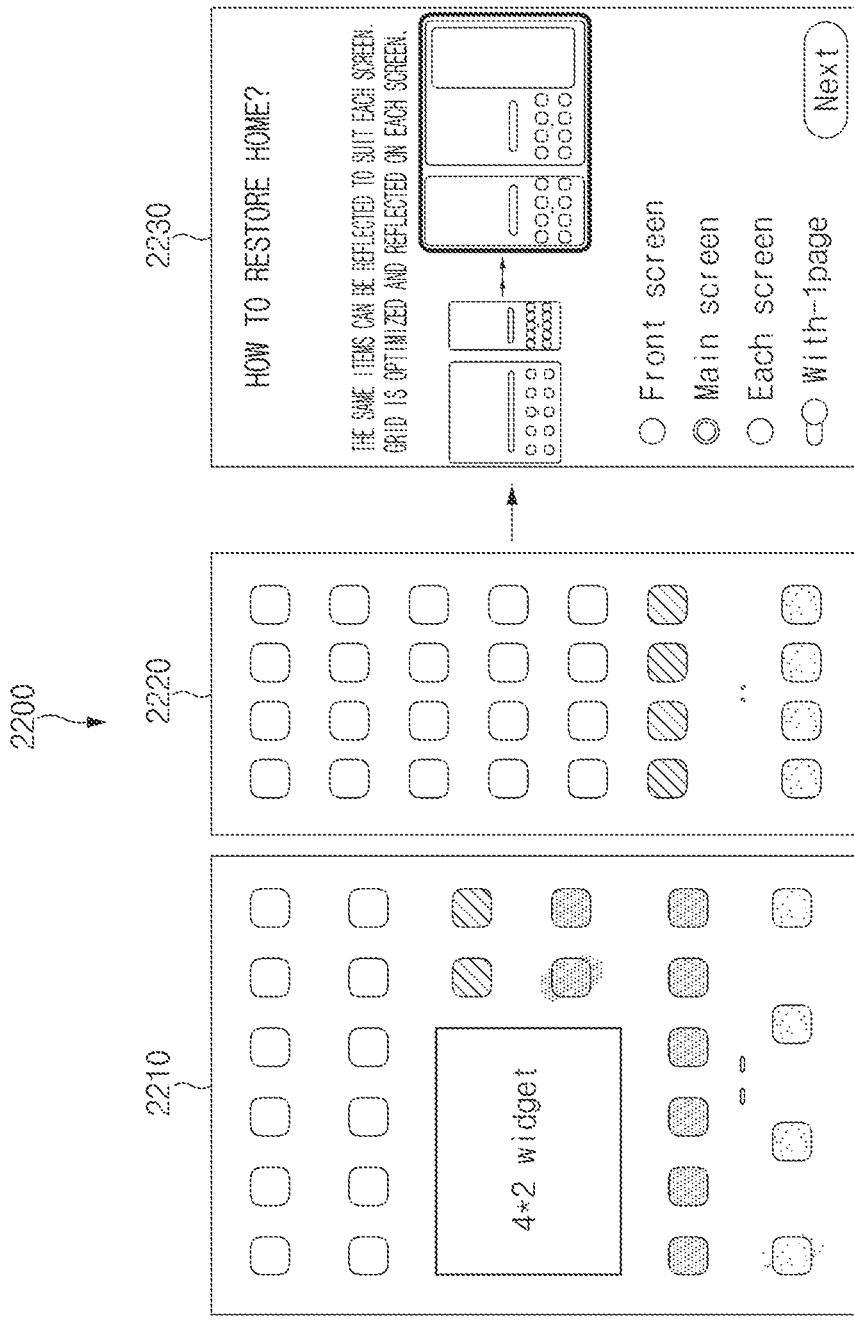
FIG. 22 is a drawing illustrating a method for restoring a home screen of a foldable electronic device on a main screen of a rollable electronic device according to an embodiment.

FIG. 22 is a drawing 2200 illustrating a method for restoring home screens 2210 and 2220 of a foldable electronic device on a main screen of a rollable electronic device (e.g., a second electronic device) according to an embodiment.

In an embodiment, the first electronic device which displays a first home screen to be backed up may be a foldable electronic device. The foldable electronic device may display the home screens 2210 and 2220 on the main screen 2210 and the front screen 2220.

In an embodiment, when the main screen is selected on an area option screen 2230, the rollable electronic device may restore the home screen 2120 displayed on the main screen to a second home screen. The home screen 2120 displayed on the main screen may be converted into a layout corresponding to a second display of the rollable electronic device to be restored to the second home screen.

In an embodiment, the restored second home screen may be displayed to correspond to a partial area of the second display. The rest of the second display may remain as a spare space or an additional area.

Figure 23:
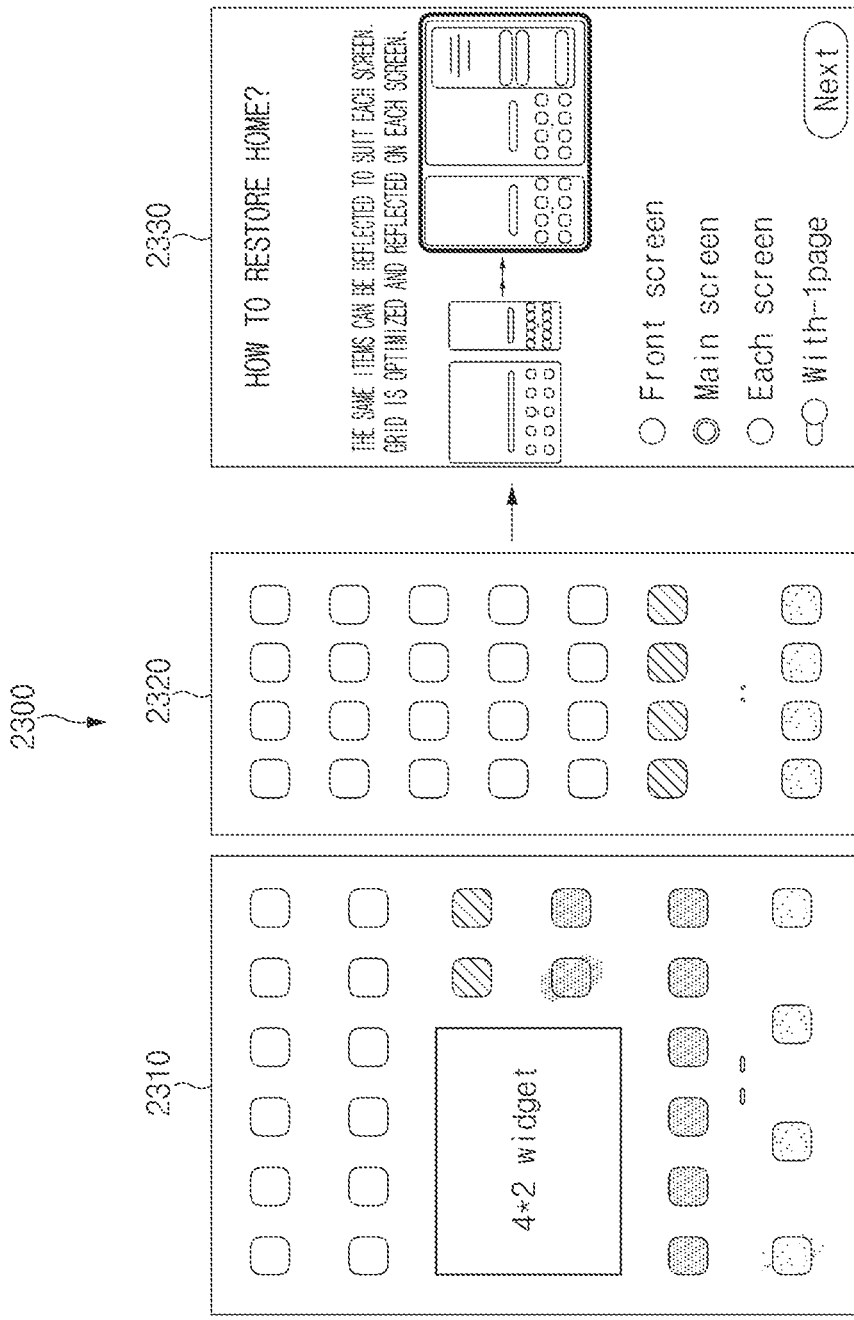
FIG. 23 is a drawing illustrating a method for restoring a home screen of a foldable electronic device, including a −1 page, on a main screen of a rollable electronic device according to an embodiment.

FIG. 23 is a drawing 2300 illustrating a method for restoring home screens 2310 and 2320 of a foldable electronic device (e.g., a first electronic device), including a −1 page, on a main screen of a rollable electronic device (e.g., a second electronic device) according to an embodiment.

In an embodiment, the first electronic device which displays first home screens 2310 and 2320 to be backed up may be a foldable electronic device. The first home screens 2310 and 2320 may be converted into a layout corresponding to a second display of the rollable electronic device to be restored to a second home screen.

In an embodiment, after a second structure of a second display of the second electronic device is determined to restore the second home screen, an additional option screen 2330 may be displayed. Content added to the second home screen may be selected on the additional option screen 2330. For example, when the −1 page is selected, content of the first home screen and the −1 page may be displayed together on the second home screen. The −1 page may be displayed on an additional area of the second display. The −1 page may display pieces of information in the form of a card.

Figure 24:
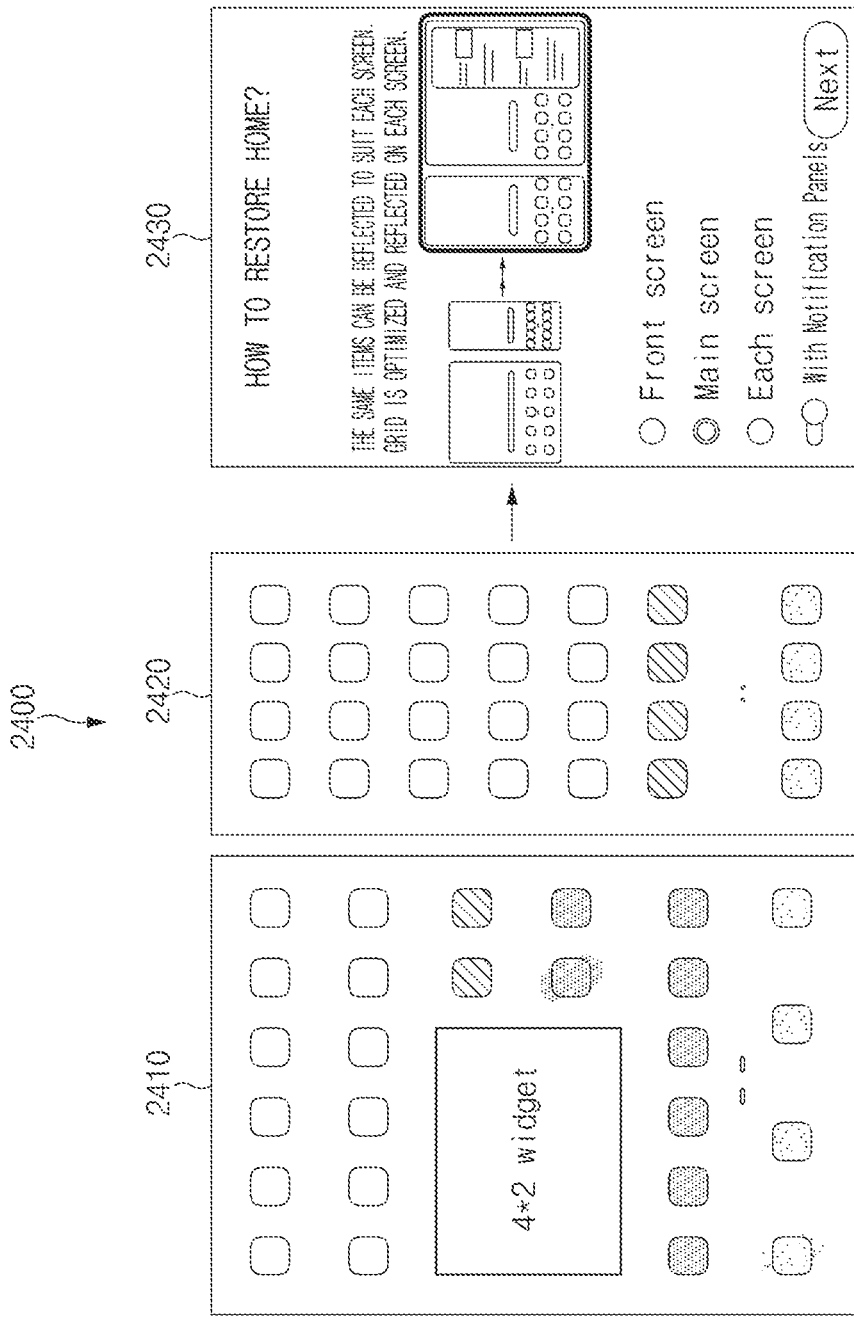
FIG. 24 is a drawing illustrating a method for restoring a home screen of a foldable electronic device, including a notification panel, on a main screen of a rollable electronic device according to an embodiment.

FIG. 24 is a drawing 2400 illustrating a method for restoring home screens 2410 and 2420 of a foldable electronic device, including a notification panel, on a main screen of a rollable electronic device (e.g., a second electronic device) according to an embodiment.

In an embodiment, the first electronic device which displays first home screens 2410 and 2420 to be backed up may be a foldable electronic device. The first home screens 2410 and 2420 may be converted into a layout corresponding to a second display of the rollable electronic device to be restored to a second home screen.

In an embodiment, after a second structure of the second display of the second electronic device is determined to restore the second home screen, an additional option screen 2430 may be displayed. Content added to the second home screen may be selected on the additional option screen 2430. For example, when the notification panel is selected, content of the first home screen and the notification panel may be displayed together on the second home screen. The notification panel may be displayed on an additional area of the second display. The notification panel may display a state of the electronic device, received information, and/or update information in the form of pop-up.

Figure 25:
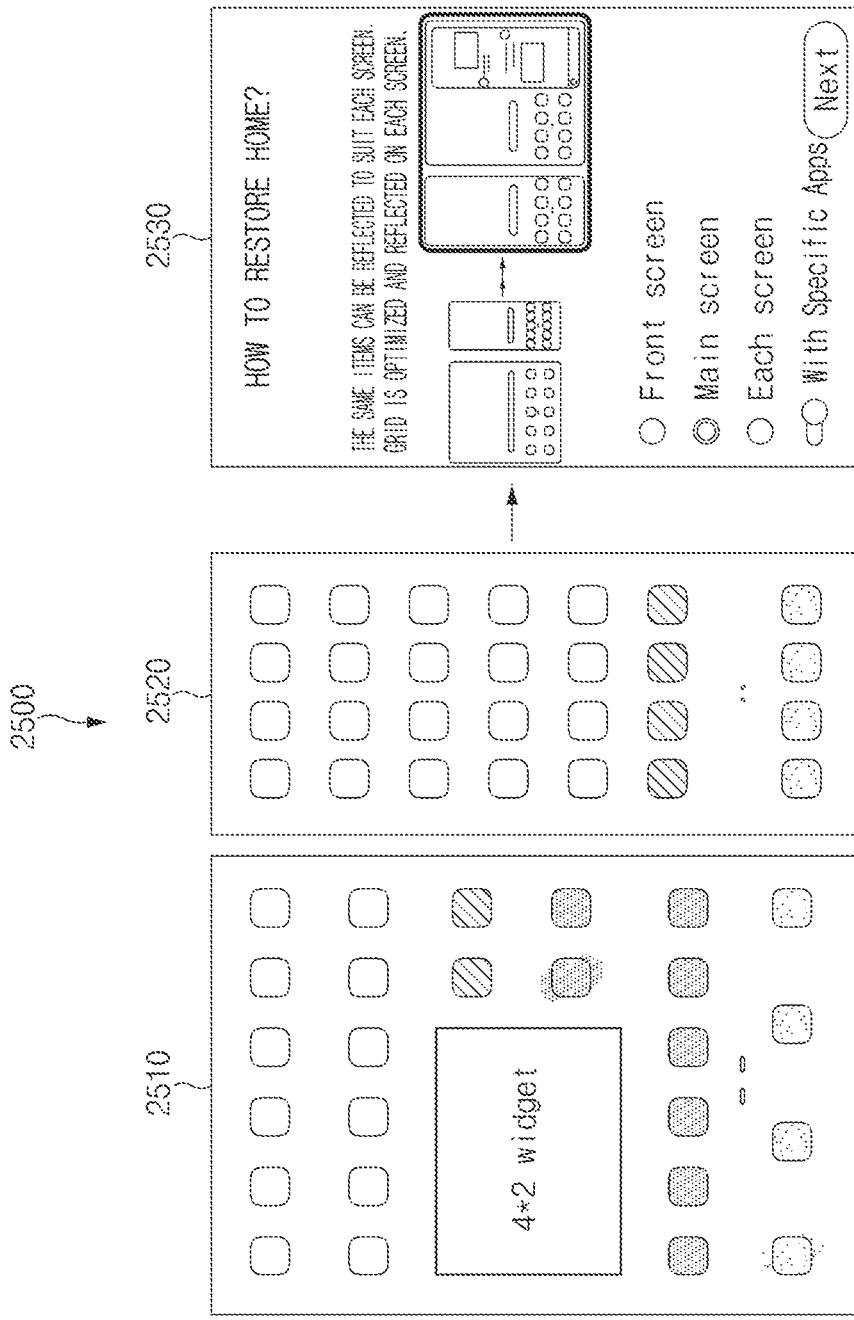
FIG. 25 is a drawing illustrating a method for restoring a home screen of a foldable electronic device, including an application running screen, on a main screen of a rollable electronic device according to an embodiment.

FIG. 25 is a drawing 2500 illustrating a method for restoring home screens 2510 and 2520 of a foldable electronic device, including an application running screen, on a main screen of a rollable electronic device (e.g., a second electronic device) according to an embodiment.

In an embodiment, the first electronic device which displays first home screens 2510 and 2520 to be backed up may be a foldable electronic device. The first home screens 2510 and 2520 may be converted into a layout corresponding to a second display of the rollable electronic device to be restored to a second home screen.

In an embodiment, after a second structure of the second display of the second electronic device is determined to restore the second home screen, an additional option screen 2530 may be displayed. Content added to the second home screen may be selected on the additional option screen 2530. For example, when a specific application is selected, content of the first home screen and a running screen of the specific application may be displayed together on the second home screen. The running screen of the specific application may be displayed on an additional area of the second display. The running screen of the specific application may display a state where the specific application is run on the background. The running screen of the specific application may be a preview screen of the specific application.

FIG. 26 is a table 2600 illustrating a method for restoring a home screen of a first electronic device on a second electronic device according to an embodiment.

In an embodiment, a terminal displaying a home screen to restore may be a smartphone and a foldable electronic device. A terminal to restore a home screen may be a foldable electronic device, a rollable electronic device, and/or a multi-foldable electronic device.

In an embodiment, when the terminal displaying the home screen to restore is the foldable electronic device, it may select the screen to restore. The screen to restore may be selected among a front screen, a main screen, or each screen.

In an embodiment, a screen to be restored on the terminal to restore the home screen may be selected. When the home screen of the smartphone is restored on the foldable electronic device, the screen to be restored may be a main screen, a front screen, or the main screen and the front screen. When the home screen of the smartphone is restored on the rollable electronic device, the screen to be restored may be a full screen, a split screen, or a screen displaying a split screen and a −1 page together. When the home screen of the smartphone is restored on the multi-foldable electronic device, the screen to be restored may be a first page, the first page and a second page, or a full page. The home screen of the smartphone may be restored on the multi-foldable electronic device on the basis of front and main synchronization.

In an embodiment, when the home screen of the foldable electronic device is restored on the foldable electronic device, the rollable electronic device, or the multi-foldable electronic device, the screen to be restored may be a main screen, a front screen, or the main screen and the front screen. When the home screen of the foldable electronic device is restored on the rollable electronic device, a −1 page may be additionally displayed on the screen to be restored.

Figure 27:
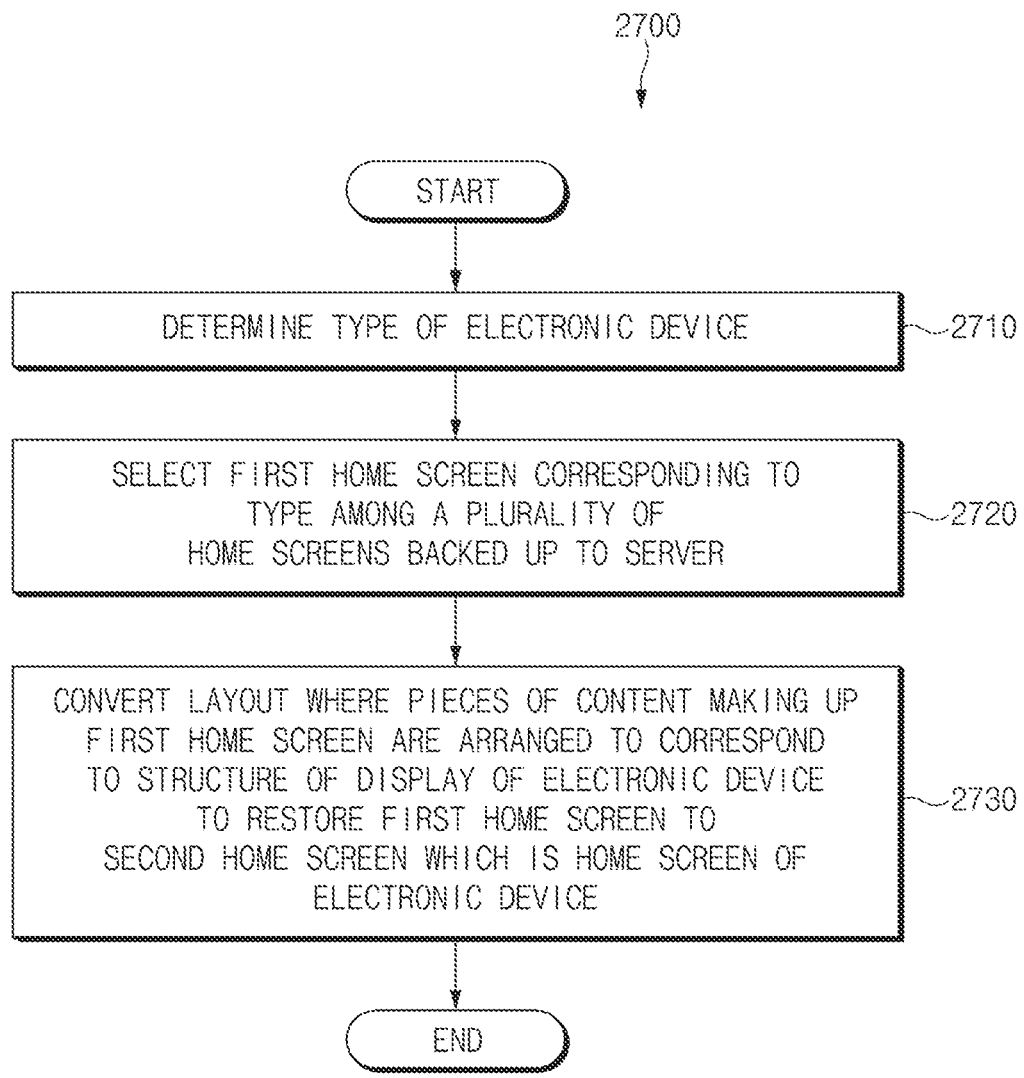
FIG. 27 is a flowchart illustrating a method for restoring a home screen of an electronic device according to another embodiment.

FIG. 27 is a flowchart 2700 illustrating a method for restoring a home screen of an electronic device according to another embodiment.

In operation 2710, the method for restoring the home screen of the electronic device according to an embodiment may determine a type of the electronic device. For example, a processor (e.g., a processor of FIG. 1) of the electronic device may determine whether the electronic device is a smartphone, a tablet, or a foldable electronic device. The processor 120 may identify a shape, a size, or a ratio of length to width of a display of the electronic device and/or identify how many areas the display has.

In operation 2720, the method for restoring the home screen of the electronic device according to an embodiment may select a first home screen corresponding to the type among a plurality of home screens backed up to a server (e.g., a server 108 of FIG. 1). The server 108 may be a universal data storage space such as cloud. Home screens may be stored in the server 108 for each type of the electronic device. For example, a home screen corresponding to a smartphone, a tablet, or a foldable electronic device may be stored in the server 108. The server 108 may store a history of the smartphone, the tablet, or the foldable electronic device. The server 108 may store a home screen specified or set by a user for the smartphone, the tablet, or the foldable electronic device. The processor 120 may set a home screen corresponding to the type of the electronic device to a first home screen.

In operation 2730, the method for restoring the home screen of the electronic device according to an embodiment may convert a layout where pieces of content making up the first home screen are arranged to correspond to a structure of a display of the electronic device to restore the first home screen to a second home screen which is a home screen of the electronic device. The second home screen may include pieces of content making up the first home screen. The second home screen may be to change a layout of the first home screen to improve space utilization and/or visibility in the structure of the display of the electronic device. When recovering the second home screen, the processor 120 may recover pieces of content to correspond to a grid of a second display which displays the second home screen.

Figure 28:
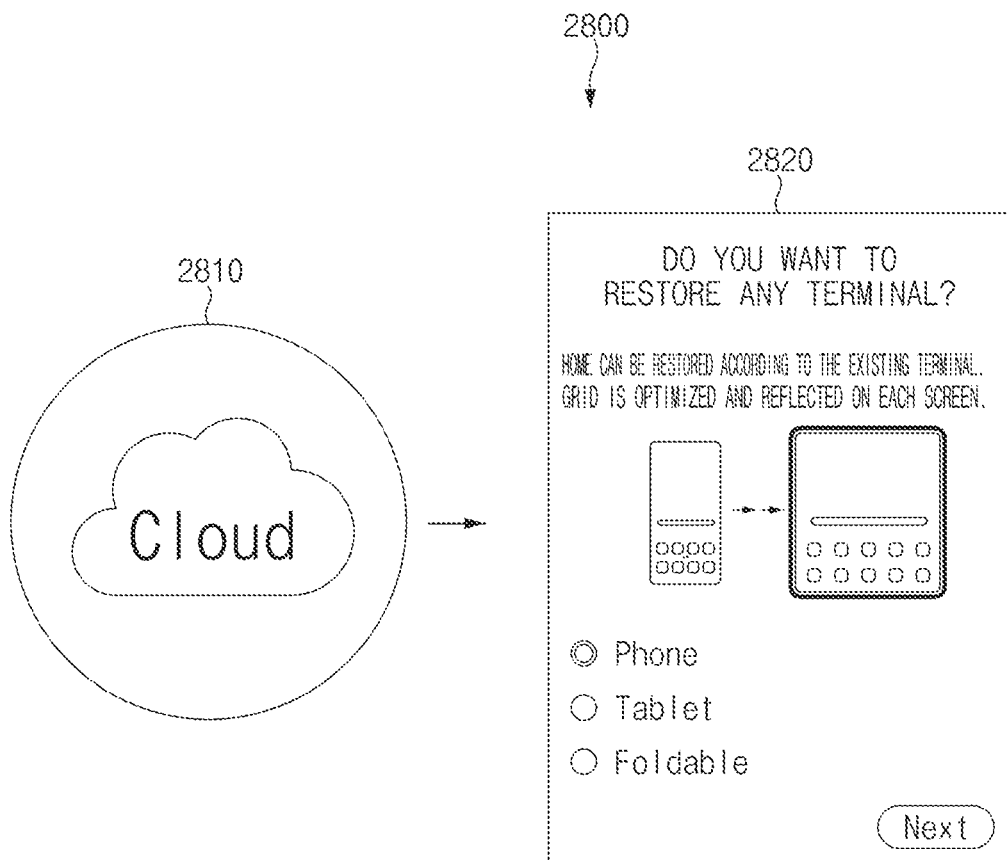
FIG. 28 is a drawing illustrating a method for restoring a home screen of a smartphone, backed up on a network, according to an embodiment.

FIG. 28 is a drawing 2800 illustrating a method for restoring a home screen of a smartphone, backed up on a network 2810, according to an embodiment.

In an embodiment, a home screen corresponding to a smartphone, a tablet, or a foldable electronic device may be stored in the network 2810.

In an embodiment, an electronic device may display a type selection screen 2820. The type selection screen 2820 may be a screen selecting whether to restore a home screen of any electronic device. For example, the type selection screen 2820 may display a menu selecting whether to restore any terminal among the smartphone, the tablet, or the foldable electronic device. When the smartphone is selected, a home screen corresponding to the smartphone among the plurality of home screens stored in the network 2810 may be set to a first home screen. A layout of content of the first home screen may be changed to correspond to a structure of a display of the electronic device to be restored to a second home screen.

Figure 29:
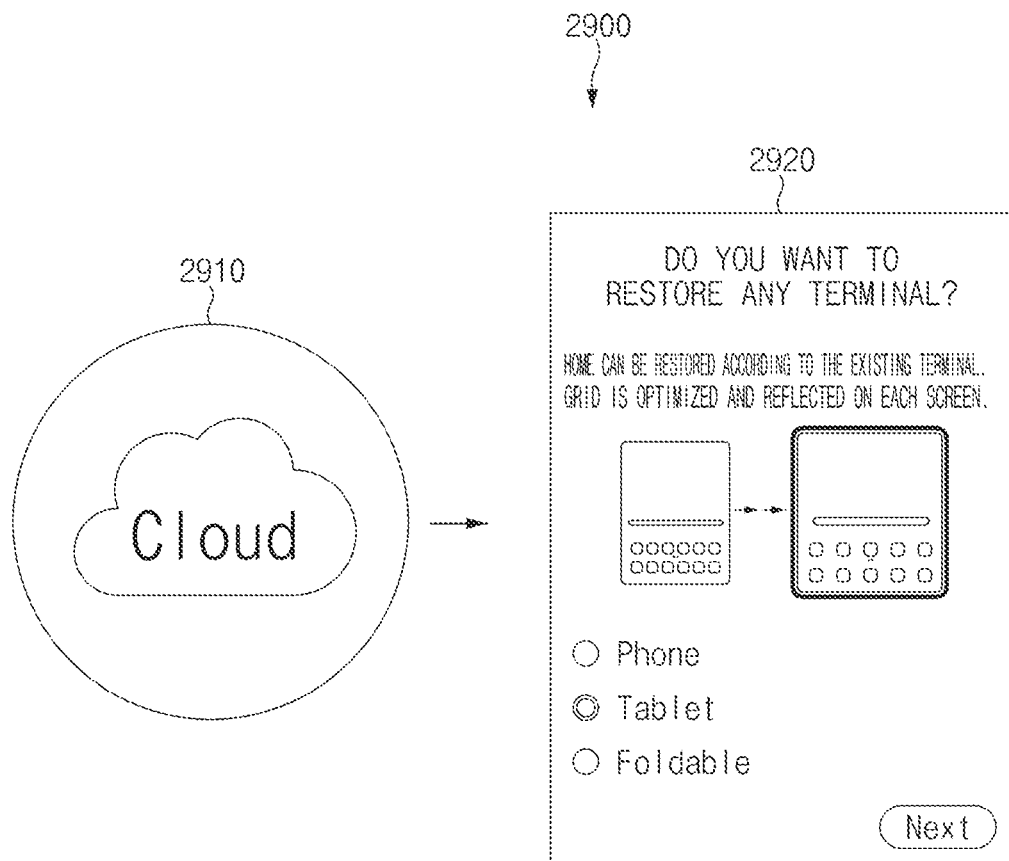
FIG. 29 is a drawing illustrating a method for restoring a home screen of a tablet, backed up on a network, according to an embodiment.

FIG. 29 is a drawing 2900 illustrating a method for restoring a home screen of a tablet, backed up on a network, according to an embodiment.

In an embodiment, a home screen corresponding to a smartphone, a tablet, or a foldable electronic device may be stored in the network 2910.

In an embodiment, an electronic device may display a type selection screen 2920. The type selection screen 2920 may be a screen selecting whether to restore a home screen of any electronic device. For example, the type selection screen 2920 may display a menu selecting whether to restore any terminal among the smartphone, the tablet, or the foldable electronic device. When the tablet is selected, a home screen corresponding to the tablet among the plurality of home screens stored in the network 2910 may be set to a first home screen. A layout of content of the first home screen may be changed to correspond to a structure of a display of the electronic device to be restored to a second home screen.

Figure 30:
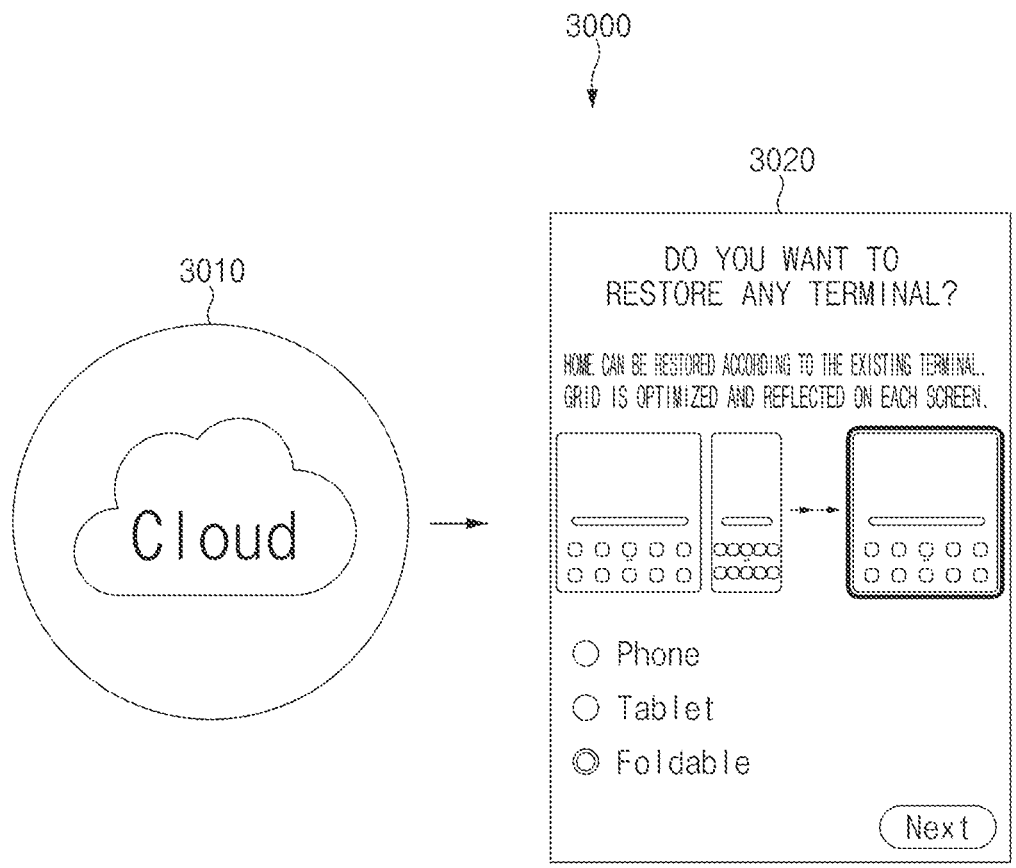
FIG. 30 is a drawing illustrating a method for restoring a home screen of a foldable electronic device, backed up on a network, according to an embodiment.

FIG. 30 is a drawing 3000 illustrating a method for restoring a home screen of a foldable electronic device, backed up on a network 3010, according to an embodiment.

In an embodiment, a home screen corresponding to a smartphone, a tablet, or a foldable electronic device may be stored in the network 3010.

In an embodiment, an electronic device may display a type selection screen 3020. The type selection screen 3020 may be a screen selecting whether to restore a home screen of any electronic device. For example, the type selection screen 3020 may display a menu selecting whether to restore any terminal among the smartphone, the tablet, or the foldable electronic device. When the foldable electronic device is selected, a home screen corresponding to the foldable electronic device among the plurality of home screens stored in the network 3010 may be set to a first home screen. A layout of content of the first home screen may be changed to correspond to a structure of a display of the electronic device to be restored to a second home screen.

FIG. 31 is a table 3100 illustrating a method for restoring a home screen of one electronic device, backed up on a network, according to an embodiment.

In an embodiment, a terminal to restore, which is an electronic device backed up on a network, may be one. A selection screen or a page of the terminal to restore may be one or plural in number.

In an embodiment, the terminal to be restored on the network may be one or plural in number. A selection screen or a page of the terminal to be restored may be one or plural in number.

FIG. 32 is a table 3200 illustrating a method for restoring home screens of a plurality of electronic devices, backed up on a network, according to an embodiment.

In an embodiment, the terminal to restore, which is an electronic device backed up on a network, may be one or plural in number. A selection screen or a page of the terminal to restore may be one by one or plural in number.

In an embodiment, the terminal to be restored on the network may be one or plural in number. A selection screen or a page of the terminal to be restored may be one or plural in number.

In an embodiment, when the home screen is restored on the network, one home screen may be restored on a plurality of electronic devices as compared with when the home screen is restored among electronic devices. Furthermore, a plurality of home screens may be restored on a plurality of electronic devices.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method for restoring a home screen of an electronic device, the method comprising:
    backing up a first home screen being a home screen of a first electronic device including a first display having a first structure;
    determining a second structure being a physical structure of a second display being a display of a second electronic device different from the first electronic device; and
    restoring the first home screen to a second home screen being a home screen of the second electronic device based on the second structure,
    wherein the restoring to the second home screen includes:
    converting a layout where a plurality of pieces of content making up the first home screen are arranged to correspond to the second structure, and
    wherein the second structure includes at least one of the number of physical screens of the second display, a type of the second display, or a shape, size, length, and/or width of the physical screen of the second display, and
    wherein the type of the second display includes a rollable display, a foldable display, a display having a single screen, or a display having multiple screens.

2. The method of claim 1, further comprising:
    displaying an area option screen selecting whether to apply the second home screen to any area of the second display, after determining the second structure.

3. The method of claim 1, further comprising:
    displaying a page option screen selecting whether to restore any of a plurality of pages making up the first home screen, after determining the second structure.

4. The method of claim 1, further comprising:
    displaying an additional option screen selecting content added to the second home screen, after determining the second structure.

5. The method of claim 1, wherein an icon that is impossible to back up among a plurality of icons included in the first home screen is provided in a stub scheme.

6. The method of claim 1, wherein the first home screen is restored to the second home screen, while a location of a widget and/or an arrangement relationship between a plurality of icons, the widget and the plurality of icons being included in the first home screen, is changed to correspond to the second structure of the second display.

7. The method of claim 1, wherein the restored second home screen is displayed to correspond to a partial area of the second display, and
    wherein the rest of the second display remains as an additional area.

8. An electronic device, comprising:
    a display;
    a memory;
    a communication circuitry; and
    a processor, wherein the processor is configured to:
    receive a first home screen being a home screen of an external electronic device, the home screen being backed up, using the communication circuitry;
    determine a physical structure of the display based on structure data stored in the memory;
    convert a layout where a plurality of pieces of content making up the first home screen are arranged to correspond to the structure to restore the first home screen to a second home screen being a home screen of the electronic device; and
    display the second home screen on the display,
    wherein the structure data includes information associated with at least one of the number of physical screens of the display, a type of the display, or a shape, size, length, and/or width of the physical screen of the display, and
    wherein the type of the display includes a rollable display, a foldable display, a display having a single display, or a display having multiple screens.

9. The electronic device of claim 8, wherein the processor is configured to:
    display an area option screen selecting whether to apply the second home screen to any area of the display on the display, after determining the structure.

10. A method for restoring a home screen of an electronic device, the method comprising:
    determining a type of the electronic device;
    selecting a first home screen corresponding to the type among a plurality of screens backed up to a server; and
    restoring the first home screen to a second home screen being a home screen of the electronic device based on a physical structure of a display of the electronic device,
    wherein the restoring to the second home screen includes:
    converting a layout where a plurality of pieces of content making up the first home screen are arranged to correspond to the structure, and
    wherein the physical structure of the display includes at least one of the number of physical screens of the display, a type of the display, or a shape, size, length, and/or width of the physical screen of the display, and
    wherein the type of the display includes a rollable display, a foldable display, a display having a single screen, or a display having multiple screens.

11. The method of claim 10, further comprising:
    displaying an area option screen selecting whether to apply the second home screen to any area of the display.

12. The method of claim 10, further comprising:
    displaying a page option screen selecting whether to restore any of a plurality of pages making up the first home screen.

13. The method of claim 10, further comprising:
    displaying an additional option screen selecting content added to the second home screen.

14. The method of claim 10, further comprising:
    displaying a type selection screen selecting whether to restore a home screen of any electronic device, after determining the type.

* * * * *